(12) United States Patent
Irshad et al.

(10) Patent No.: US 12,480,671 B2
(45) Date of Patent: Nov. 25, 2025

(54) SYSTEM AND METHODS FOR THERMOELECTRIC AIR COOLING AND HEATING

(71) Applicant: KING FAHD UNIVERSITY OF PETROLEUM AND MINERALS, Dhahran (SA)

(72) Inventors: Kashif Irshad, Dhahran (SA); Salem Algarni, Dhahran (SA); Hasan Zahir, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 452 days.

(21) Appl. No.: 17/850,252

(22) Filed: Jun. 27, 2022

(65) Prior Publication Data

US 2023/0417430 A1    Dec. 28, 2023

(51) Int. Cl.
*F24F 5/00*     (2006.01)
(52) U.S. Cl.
CPC .................. *F24F 5/0042* (2013.01)
(58) Field of Classification Search
CPC ....... F24F 5/0042; F24F 5/0075; F24F 5/0092
See application file for complete search history.

(56) References Cited

U.S. PATENT DOCUMENTS

| | | | | |
|---|---|---|---|---|
| 2001/0005990 A1* | 7/2001 | Kim | ...................... | F24F 5/0042 165/59 |
| 2002/0068338 A1* | 6/2002 | Nanda | ..................... | C12M 35/02 435/173.6 |
| 2006/0085167 A1* | 4/2006 | Warfield | ................. | H02S 50/10 702/188 |
| 2010/0022177 A1* | 1/2010 | Hidaka | .................... | B60H 3/02 62/271 |

(Continued)

FOREIGN PATENT DOCUMENTS

| | | | | |
|---|---|---|---|---|
| CN | 102121298 B | | 6/2012 | |
| CN | 110528745 A | * | 12/2019 | ............... E04B 2/88 |
| CN | 112484323 A | | 3/2021 | |

(Continued)

OTHER PUBLICATIONS

CN-110528745-A Translation (Year: 2019).*
Ahmed ; Recent Advances in Photovoltaic-Trombe Wall System: A Review ; Mar. 4, 2020 ; 11 Pages.

*Primary Examiner* — Schyler S Sanks
(74) *Attorney, Agent, or Firm* — Oblon, McClelland, Maier & Neustadt, L.L.P.

(57) ABSTRACT

A system and methods for photovoltaic phase change material assisted thermoelectric air cooling and heating of a building includes a photovoltaic phase change material wall unit which is cooled by absorption of heat by a phase change material attached to the photovoltaic wall unit; a photovoltaic phase change material roof unit which converts solar radiation into electric energy; Peltier based thermoelectric (Continued)

units configured to heat and cool air streams passing through an air duct; and Seebeck effect based thermoelectric units which convert a temperature gradient into thermoelectric power. A hot air stream in the air duct is directed to an air duct on a roof of the building and a cold air stream from the first air duct is circulated into the building interior to achieve thermal comfort.

14 Claims, 25 Drawing Sheets

(56) References Cited

U.S. PATENT DOCUMENTS

2013/0082115 A1* 4/2013 May .................... F24F 13/1426
                                                                  236/51
2019/0309961 A1* 10/2019 Suarez ...................... F24F 3/14

FOREIGN PATENT DOCUMENTS

| CN | 112902340 A | 6/2021 |
| MY | 2014PI3362 A | 6/2016 |
| MY | 168144 A * | 10/2018 |

* cited by examiner

SYSTEM AND METHODS FOR THERMOELECTRIC AIR COOLING AND HEATING

BACKGROUND

Technical Field

The present disclosure generally relates to thermal systems and, more specifically, to a system and a method for management and control of the internal temperature of a building by using a combination of thermoelectric units and photovoltaic units including phase change materials.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Providing thermal comfort has been a challenge for most developing countries because the air conditioning process in buildings, in particular large buildings, may involve excessive use of energy. With the rapidly increasing global energy consumption, much effort has been devoted to reducing total energy consumption and carbon dioxide emissions. Conventional approaches include replacing regular power technologies with alternative energy sources. Solar energy is a sustainable energy source, which can be utilized to provide alternative energy.

Traditional thermal systems use thermoelectric equipment or components powered by a utility grid to heat and cool interior spaces of buildings. Such thermal systems may include, for example, a thermal insulator and a roofing material. These thermoelectric equipment and components typically consume more energy than conventional heating and cooling systems. Further, conventionally known thermoelectric systems capable of providing thermal comfort are based on rigid programs and structures, and do not dynamically adapt to changing environmental conditions.

Accordingly, it is one object of the present disclosure to provide methods and systems that achieve thermal comfort in buildings, and adapt automatically and dynamically to the changing environmental conditions, by using photovoltaic units incorporating phase change materials, Peltier based thermoelectric units and Seebeck based thermoelectric units within air ducts of a building.

SUMMARY

In an exemplary embodiment, air cooling and heating system for a building is provided. The building includes plurality of walls, a floor, and a roof. The air cooling and heating system includes a photovoltaic phase change material wall unit attached to a first wall so that a back side of the photovoltaic phase change material wall unit faces the first wall, a front side of the photovoltaic phase change material wall unit faces towards an exterior environment, where an air gap is formed between the backside and the first wall. The photovoltaic phase change material wall unit is configured to generate a first electric current from a solar radiation. The air cooling and heating system further includes a first air duct attached to a second wall and a second air duct connected to the first air duct and the air gap. The second wall is opposite the first wall and the second air duct is attached to the roof. The air cooling and heating system further includes a plurality of Peltier based thermoelectric units located in the first air duct, a plurality of Seebeck effect based thermoelectric units located in the second air duct, and a photovoltaic phase change material roof unit attached to an exterior surface of the second air duct. The plurality of Peltier based thermoelectric units are configured to convert an air flow in the first air duct from a first temperature to a second temperature; the plurality of Seebeck effect based thermoelectric units are configured to generate a thermoelectric power from a temperature differential between an air flow in the second air duct and an air flow in a building interior; and the photovoltaic phase change material roof unit is configured to convert the solar radiation to a second electric current and provide at least a portion of the second electric current to the plurality of Peltier based thermoelectric units. The air cooling and heating system further includes a rechargeable battery, a plurality of vents, a plurality of grates, and at least one fan configured to draw the air flow through the air gap, the first air duct, the second air duct, and the building interior. A controller of the system is connected to each of the photovoltaic phase change material wall unit, the photovoltaic phase change material roof unit, the plurality of Peltier based thermoelectric units, the plurality of Seebeck effect based thermoelectric units, the rechargeable battery, and the at least one fan. The controller is configured to control the photovoltaic phase change material wall unit, the photovoltaic phase change material roof unit, the plurality of Peltier based thermoelectric units, the plurality of Seebeck effect based thermoelectric units, and the at least one fan to circulate the air flow within the air gap, the first air duct, the second air duct, and the building interior.

In another exemplary embodiment, a method for controlling a temperature of a building is provided. The method includes attaching a photovoltaic phase change material wall unit to a first wall of the building, such that an air gap is formed therebetween; generating, with the photovoltaic phase change material wall unit, a first electric current; attaching a roof air duct to a roof of the building; attaching a photovoltaic phase change material roof unit to an exterior surface of the roof air duct; generating, with the photovoltaic phase change material roof unit, a second electric current; generating, with a plurality of Seebeck effect based thermoelectric units located in the roof air duct, a thermoelectric power; charging a rechargeable battery with the second electric current and the thermoelectric power; attaching a wall air duct to a second wall of the building, where the second wall is opposite the first wall. The wall air duct is bifurcated along a central axis which extends from a floor of the building to the roof. The method further includes attaching each of a plurality of Peltier based thermoelectric units to the divider such that a first ceramic plate contacts a divider and faces a first half of the wall air duct which is attached to the second wall and a second ceramic plate extends into a second half of the wall air duct; joining the second half of the wall air duct to the roof air duct; attaching a first vent to a junction between the air gap and the roof air duct; installing a first fan in the first vent; attaching a second vent to a junction between the first half of the wall air duct and a building interior; installing a second fan in the second vent; installing a first grate in the first wall near the floor; and installing a second grate in the wall air duct near the floor. The first grate is configured to provide a first air flow passage between a building interior and the air gap, and the second grate is configured to provide a second air flow passage between an exterior environment and the wall air duct. The method also includes providing, by a controller connected to the rechargeable battery, power to each of the plurality of Peltier effect based thermoelectric units; generating, by each of the plurality of Peltier effect based thermoelectric units, a temperature differential between the first ceramic plate and the second ceramic plate; actuating, by the controller, the first fan to suction air through the first grate, through the air gap, and through the roof air duct, and to expel the air through the first vent to the exterior environment; and actuating, by the controller, the second fan to draw air through the second grate into the wall air duct, through the first half of the wall air duct, and through the second vent, and expel the air into the building interior.

In another exemplary embodiment, a method for installing a photovoltaic phase change material assisted thermoelectric air cooling and heating system on a building is provided. The method includes attaching a photovoltaic phase change material wall unit to a first wall of the building such that an air gap is formed therebetween; attaching a roof air duct to a roof of the building; attaching a photovoltaic phase change material roof unit to an exterior surface of the roof air duct; installing a plurality of Seebeck effect based thermoelectric units in the roof air duct; connecting a rechargeable battery to the photovoltaic phase change material wall unit, the photovoltaic phase change material roof unit and the plurality of Seebeck effect based thermoelectric units; connecting a thermostat to a building interior; attaching a wall air duct to a second wall of the building, wherein the second wall is opposite the first wall, where the wall air duct is bifurcated along a central axis by a divider which extends from a floor of the building to the roof; attaching each of a plurality of Peltier based thermoelectric units to the divider such that a first ceramic plate contacts the divider and faces a first half of the wall air duct which is attached to the second wall and a second ceramic plate extends into a second half of the wall air duct; joining the first half of the wall air duct to the roof air duct; attaching a first vent to a junction between the air gap and the roof air duct; installing a first fan in the first vent; attaching a second vent to a junction between the second half of the wall air duct and the building interior; installing a second fan in the second vent; installing a first grate in the first wall near the floor, wherein the first grate is configured to provide a first air flow passage between a building interior and the air gap; installing a second grate in the first duct near the floor, wherein the second grate is configured to provide a second air flow passage between an exterior of the building and the wall air duct; and connecting the controller to the photovoltaic phase change material wall unit, the photovoltaic phase change material roof unit, the plurality of Seebeck effect based thermoelectric units, the plurality of Seebeck effect based thermoelectric units, the first fan, the second fan, the thermostat, and the rechargeable battery.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
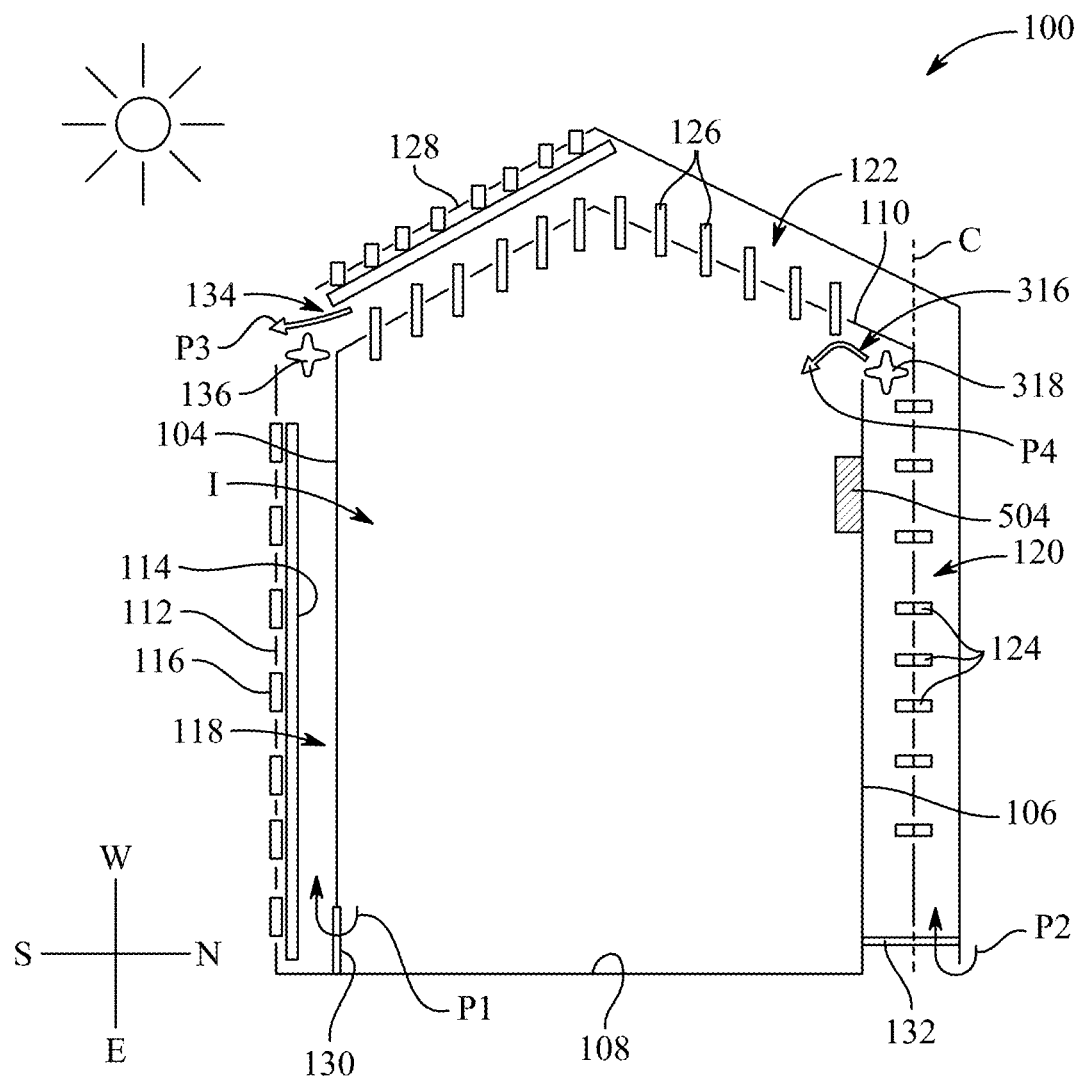
FIG. 1 illustrates a building implementing an air cooling and heating system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a system and methods for controlling building environments, which effectively address energy and environmental issues. The methods and the system provide a self-organizing structure, which adapts dynamically to changing environmental conditions.

In one aspect of the present disclosure, a photovoltaic phase change material assisted thermoelectric (PV-PCM-TE) system for a building includes at least one air duct attached to the building, which channels an air flow into the building and to its roof; a first thermoelectric unit installed within at least one of the air ducts, which produces cold and hot air flows; a second thermoelectric unit installed on the roof of the building which generates electricity; the cold air flow is channeled into the building, while the hot air flow is channeled to its roof; a plurality of photovoltaic (PV) units installed on least one surface of the roof and wall of the building to convert solar radiation into electrical energy; a phase change material (PCM) installed on a back side of each PV panel, where the PCM absorbs the heat generated by the PV panel and increases the efficiency of the PV panel. A first PV-PCM wall unit is positioned at one end of the building and a second PV-PCM unit is installed on the roof, and the thermoelectric unit installed in the air duct is positioned at another end and on the roof.

In aspects of the present disclosure, the system reduces heat penetration inside the building and also improves photovoltaic power conversion efficiency by integrating a phase change material layer, instead of a using a conventional Trombe wall or conventional photovoltaic wall unit. Additionally, the thermoelectric unit on the roof converts a temperature differential between the roof air duct and the roof to electricity, which is stored in a battery.

FIG. 1 illustrates a building implementing an air cooling and heating system 100 (hereinafter referred to as "the system 100"), according to an embodiment of the present disclosure. The building includes a plurality of walls, such as a first wall 104 and a second wall 106; a floor 108; and a roof 110. The system 100 includes a photovoltaic phase change material wall unit 112 attached to the first wall 104, so that a back side 114 of the photovoltaic phase change material wall unit 112 faces the first wall 104. An air gap 118 between the back side 114 of the photovoltaic phase change material (PV-PCM) wall unit 112 and the first wall 104 allows air flow along the back side 114 of the PV-PCM wall unit 112 to remove excess heat generated by the PV-PCM wall unit 112. In some embodiments, the PV-PCM wall unit 112 may be attached to the first wall 104 using mounting structures, such as slotted angles and clamping slots. A front side 116 of the PV-PCM wall unit 112 faces towards an exterior environment, such that solar radiation is incident on the front side 116. As such, the PV-PCM wall unit 112 is configured to generate a first electric current from the solar radiation incident thereon.

The system 100 further includes a first air duct 120 and a second air duct 122. The first air duct 120 is attached to the second wall 106, where the second wall 106 is opposite the first wall 104, and the second air duct 122 is attached to the roof 110. The system 100 further includes a plurality of Peltier based thermoelectric units 124 located in the first air duct 120, a plurality of Seebeck effect based thermoelectric units located in the second air duct 122, and a photovoltaic phase change material (PV-PCM) roof unit 128 attached within an exterior surface of the second air duct 122 such that the photovoltaic panel faces the exterior environment and the PCM resides in the second air duct 122. Each of the Peltier based thermoelectric units 124 is configured to convert an air flow in the first air duct 120 from a first temperature to a second temperature. As used herein, the "first temperature" refers to a temperature of the exterior environment and the "second temperature" refers to a temperature value of the air flow increased or decreased with respect to the temperature of the exterior environment. The plurality of Seebeck effect based thermoelectric units 126 are configured to generate a thermoelectric power from a temperature differential (or, gradient) between an air flow in the second air duct 122 and an air flow in a building interior "I".

The PV-PCM roof unit 128 is configured to convert the solar radiation to a second electric current and provide at least a portion of the second electric current to the plurality of Peltier based thermoelectric units 124. The system 100 further includes a rechargeable battery 502 (shown in FIG. 5), a plurality of vents (such as a first vent 134 and a second vent 316), a plurality of grates (such as a first grate 130 and a second grate 132), and at least one fan (such as a first fan 136 and a second fan 318) configured to draw the air flow through the air gap 118, the first air duct 120, the second air duct 122, and the building interior "I".

As used herein, the term "phase change material" (PCM) refers to a substance which releases/absorbs heat energy at phase transition to provide useful heat/cooling. In one aspect, the PCM may be paraffin wax which is a commonly used PCM substance used for electronics thermal management because it has a high heat of fusion per unit weight, has a large melting point selection, provides dependable cycling, and is non-corrosive and is chemically inert. However, in some aspects, salt hydrates and other known hygroscopic materials may be used as PCM.

Based on their comprehensive thermal properties, reliability, corrosiveness, and cost, PCM applications in systems are primarily classified as organic PCM (OPCM), inorganic PCM (IPCM), and eutectic PCM (EPCM). The advantages of OPCMs include non-corrosives and low undercooling, while the disadvantages of OPCMs include high price, inflammability, and low thermal conductivity. OPCMs are the most commonly used PCMs in the heating applications, which contain organic/paraffin PCMs (OPPCMs) and organic/non-paraffin PCMs (ONPCMs). IPCMs have the advantage of higher latent heat, while they have disadvantages of subcooling, corrosion, phase separation, and low thermal stability. Furthermore, the advantages of EPCMs include no subcooling or phase segregation, high density and high thermal conductivity, with the disadvanges of low latent heat and low specific heat. The PCM chosen may be selected from the group comprising an OPPCM, an IPCM, an EPCM and an ONPCM, preferably the OPPCM, the IPCM, and the EPCM, and most preferably the OPPCM.

The system 100 further includes a first grate 130 located in the first wall 104 near the floor 108 and a second grate 132 located in the second wall 106 near the floor 108. The first grate 130 is configured to provide a first air flow passage "P1" between the building interior "I" and the air gap 118, and the second grate 132 is configured to provide a second air flow passage "P2" between the exterior environment and the second air duct 122. In some embodiments, the second grate 132 may include a filter (such as a fiberglass filter) to eliminate dust particles from entering the first air duct 120 and thus the building interior "I". The system 100 further includes a first vent 134 located between the air gap 118 and the second air duct 122. The first vent 134 is configured to provide a third air flow passage "P3" between the external environment, the air gap 118 and the second air duct 122. A first fan 136 is located in a junction between the air gap 118 and the second air duct 122. The first fan 136 is configured to suction air from the air gap 118 and the second air duct and expel the suctioned air through the first vent 134 into the exterior environment.

Figure 2:
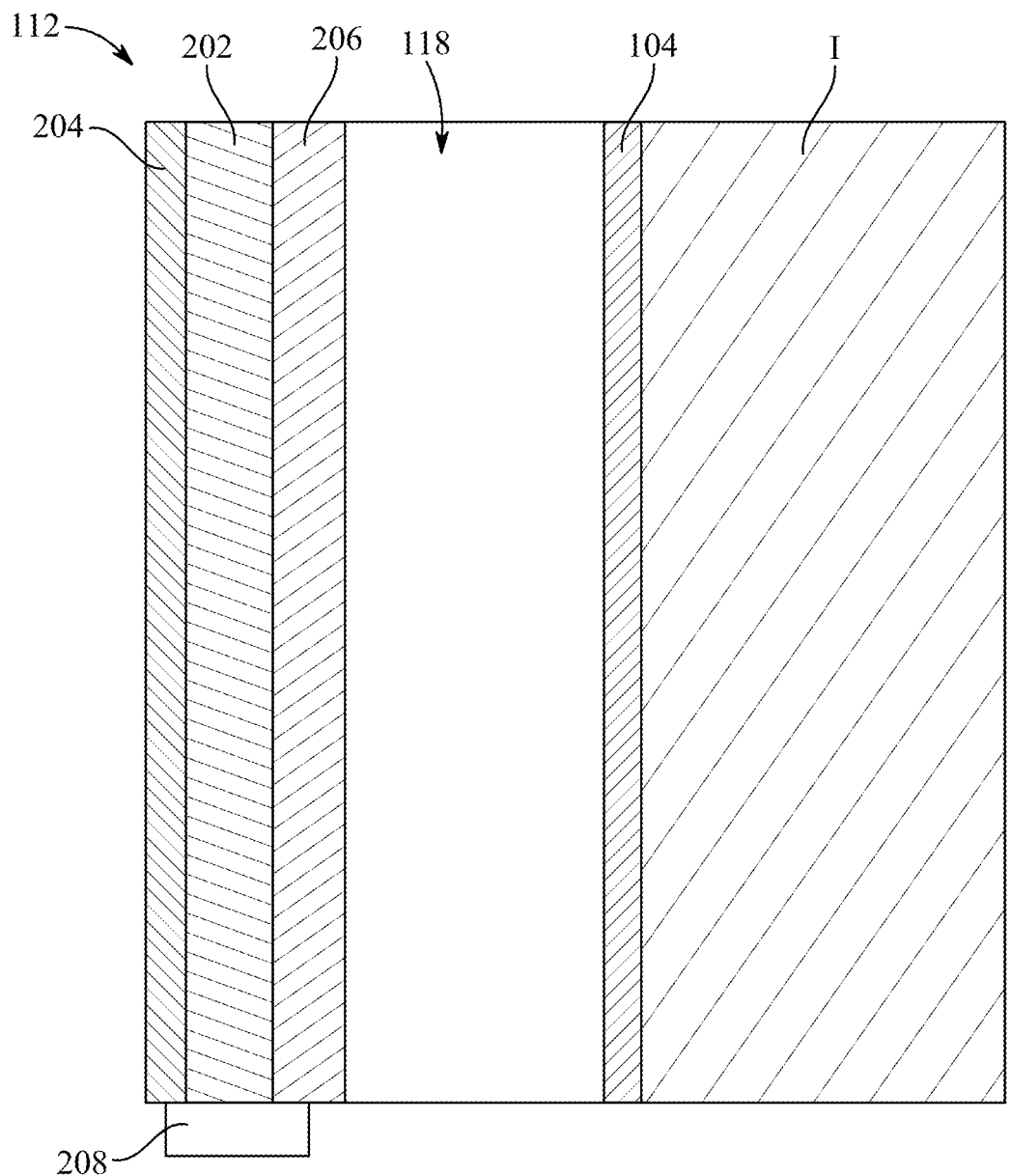
FIG. 2 illustrates a portion of a cross-section of a photovoltaic phase change material wall unit of the air cooling and heating system, according to certain embodiments.

FIG. 2 illustrates a portion of a cross-section of the PV-PCM wall unit 112, which is attached to the first wall 104 leaving an air gap 118 for air flow. The PV-PCM roof unit 128 is similarly constructed. The PV-PCM wall unit 112 includes a first photovoltaic panel 202 including a plurality of arrays of solar cells; a first glazed cover 204 located on a front side of the first photovoltaic panel 202; a first photovoltaic phase change material 206 configured to cover a back side of the first photovoltaic panel 202; and a first junction box 208 including electrical circuitry connected to the plurality of arrays of solar cells of the first photovoltaic panel 202. As used herein with respect to the first photovoltaic panel 202, the term "front side" refers to a surface of the first photovoltaic panel 202 corresponding to the front side 116 of the PV-PCM wall unit 112 and the term "back side" refers to a surface of the first photovoltaic panel 202 corresponding to the back side 114 of the PV-PCM wall unit 112.

Figure 3:
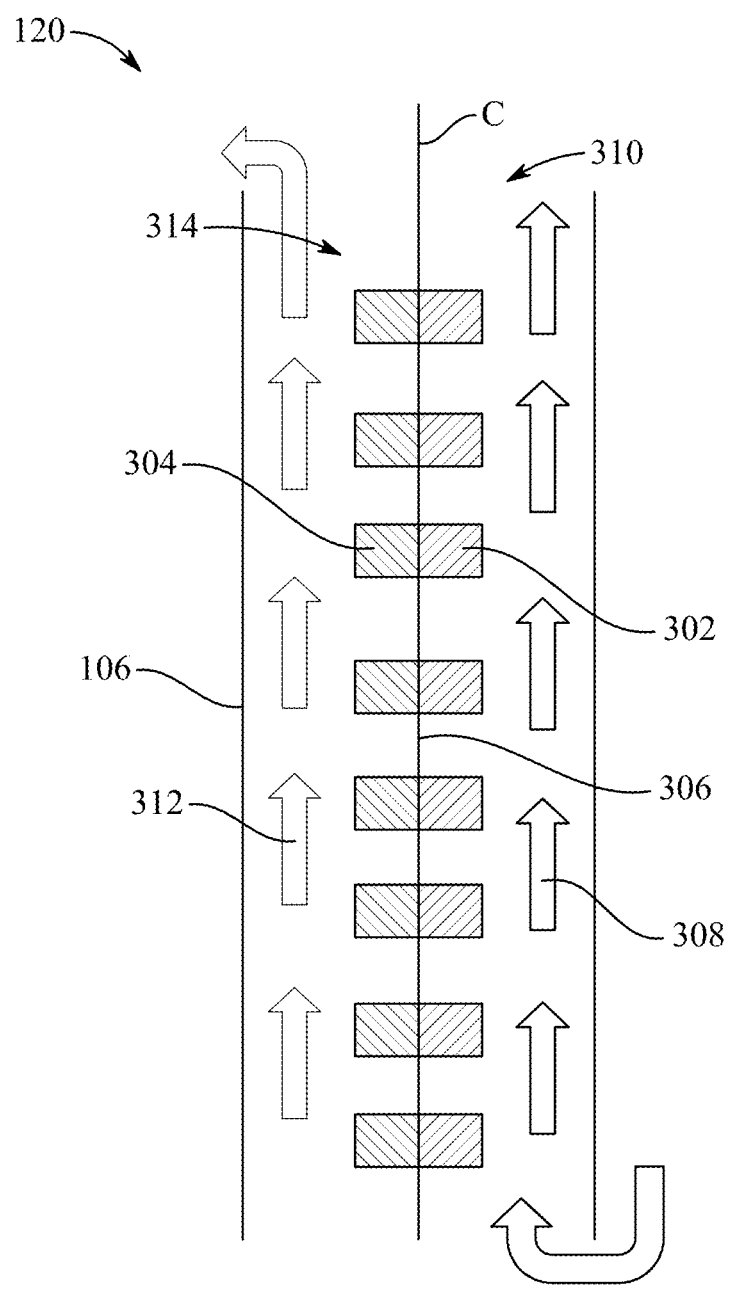
FIG. 3 is an exemplary illustration of a first air duct of the air cooling and heating system having multiple Peltier based thermoelectric units, according to certain embodiments.

FIG. 3 is an exemplary illustration of the first air duct 120. As described earlier, the Peltier based thermoelectric units 124 are located in the first air duct 120. In an aspect of the present disclosure, the plurality of Peltier based thermoelectric units 124 are configured to convert one of a hot air flow from the exterior environment to a cool air flow in the first air duct 120 or a cool air flow from the exterior environment to a hot air flow in the first air duct 120. In some aspects, each Peltier based thermoelectric unit 124 includes a first ceramic plate 302 and a second ceramic plate 304.

The system 100 includes a divider 306 located in the first air duct 120. The divider 306 is located along a central axis "C" (also shown in FIG. 1) which extends from the floor 108 to the roof 110. According to an aspect, the divider 306 bisects the air flow in the first air duct 120 into a first air stream 308 at the first temperature in a first half 310 of the first air duct 120 and a second air stream 312 at the second temperature in a second half 314 of the first air duct 120. In some embodiments, each of the plurality of Peltier based thermoelectric units 124 is attached to the divider 306 such that the first ceramic plate 302 contacts the divider 306, and the second ceramic plate 304 extends into the second half 314 of the first air duct 120. Herein, the first temperature equals the temperature of the exterior environment, and the second temperature equals a temperature of the second ceramic plate 304 of each of the Peltier based thermoelectric units 124. As described earlier, at least a portion of the second electric current generated by the photovoltaic phase change material wall roof unit 128 is supplied to the Peltier based thermoelectric units 124. With aid of the second electric current, each of the first ceramic plate 302 and the second ceramic plate 304 may be maintained at different temperatures. In some aspects, a heat sink (not shown) may be coupled to the second ceramic plate 304, so that heat from the heat sink may be transferred to the second air stream 312.

With reference to FIG. 1 and FIG. 3, the system 100 further includes a second vent 316 (shown in FIG. 1) located between the building interior "I" and the second half 314 of the first air duct 120 at a position where the second wall 106 meets the roof 110. The second vent 316 is configured to provide a fourth air flow passage "P4" between the second half 314 of the first air duct 120 and the building interior "I". A second fan 318 (shown in FIG. 1) is located in the second vent 316 and configured to suction the second air stream 312 from the second half 314 of the first air duct 120 and expel the second air stream 312 through the second vent 316 into the building interior "I".

In some aspects, each of the first vent 134 and the second vent 316 includes a plurality of moveable vanes (not shown) connected to a lever (not shown), where the lever is configured to open and close the plurality of moveable vanes. Each of the first vent 134 and the second vent 316 may also include a motor (not shown) connected to the lever, where the motor is configured to raise and lower the lever.

Figure 4:
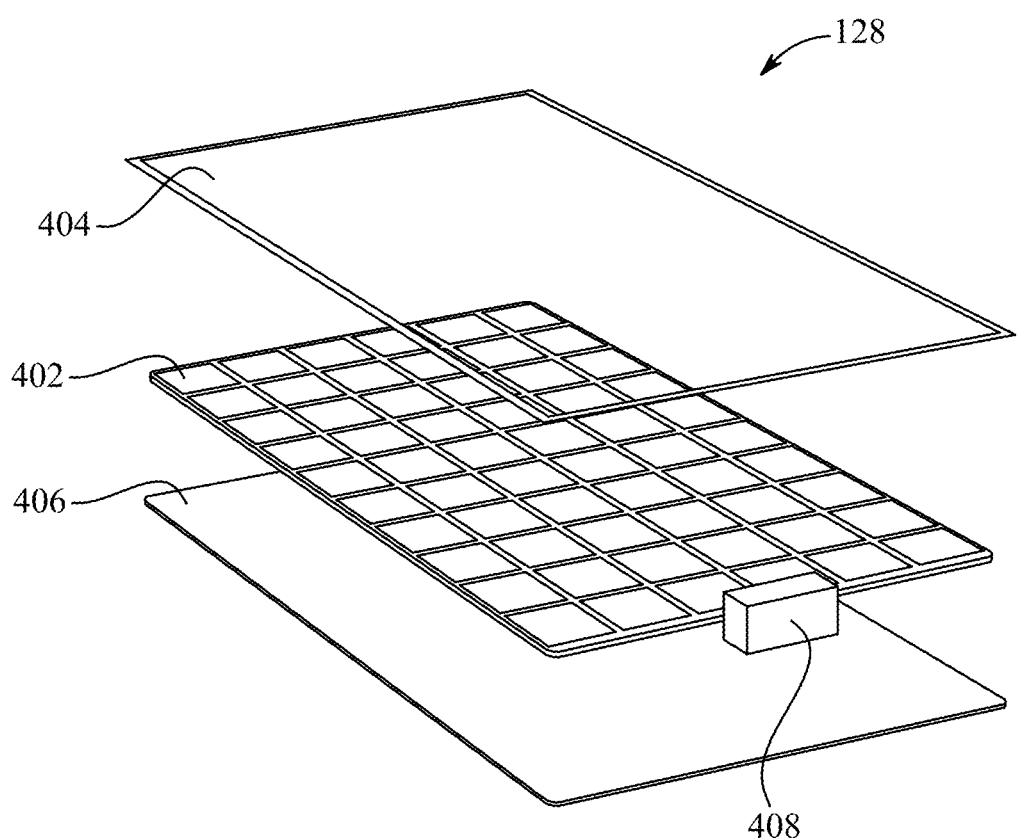
FIG. 4 illustrates an exploded view of an exemplary photovoltaic phase change material roof unit of the air cooling and heating system, according to certain embodiments.

FIG. 4 illustrates an exploded view of an exemplary PV-PCM roof unit 128. The PV-PCM roof unit 128 includes a second photovoltaic panel 402 including a plurality of arrays of solar cells, a second glazed cover 404 located on a top side of the second photovoltaic panel 402, and a second photovoltaic phase change material 406 configured to cover a back side of the second photovoltaic panel 402. The second glazed cover 404 faces the exterior environment and the back side of the second photovoltaic panel 402 is in contact with the air flow in the second air duct 122. The system 100 also includes a second junction box 408 including electrical circuitry connected to the plurality of arrays of solar cells of the second photovoltaic panel 402. The second junction box 408 is connected to the plurality of Peltier based thermoelectric units 124, such that the second electric current is provided to the plurality of Peltier based thermoelectric units 124.

In some aspects of the present disclosure, the PV-PCM roof units 128 may be installed at an angle of 35° with respect to the exterior surface of the roof 110 for optimal sunlight absorption. In some aspects, a maximum power point tracking (MPPT) system may be operably coupled to the PV-PCM roof units 128 to adjust the angle to receive maximum solar radiation.

To this end, it may be observed that a PCM layer is used at a rear surface of each of the PV-PCM wall unit 112 and the PV-PCM roof unit 128. The PCM operates under the principle that, while the arrays of solar cells (PV cells) uses a part of the solar spectrum to produce energy, a remainder of the solar spectrum is converted into heat, which is absorbed by the PCM, contributing to an increase in temperature of the PCM, which undergoes a phase transition to absorb the heat. As solar radiation reduces, or the PCM is cooled as in the present disclosure, the PCM releases the stored energy via reversing the phase change. Therefore, the PCM plays the functions of storing heat energy and maintaining operation of the PV cells at the optimal working temperature.

Figure 5:
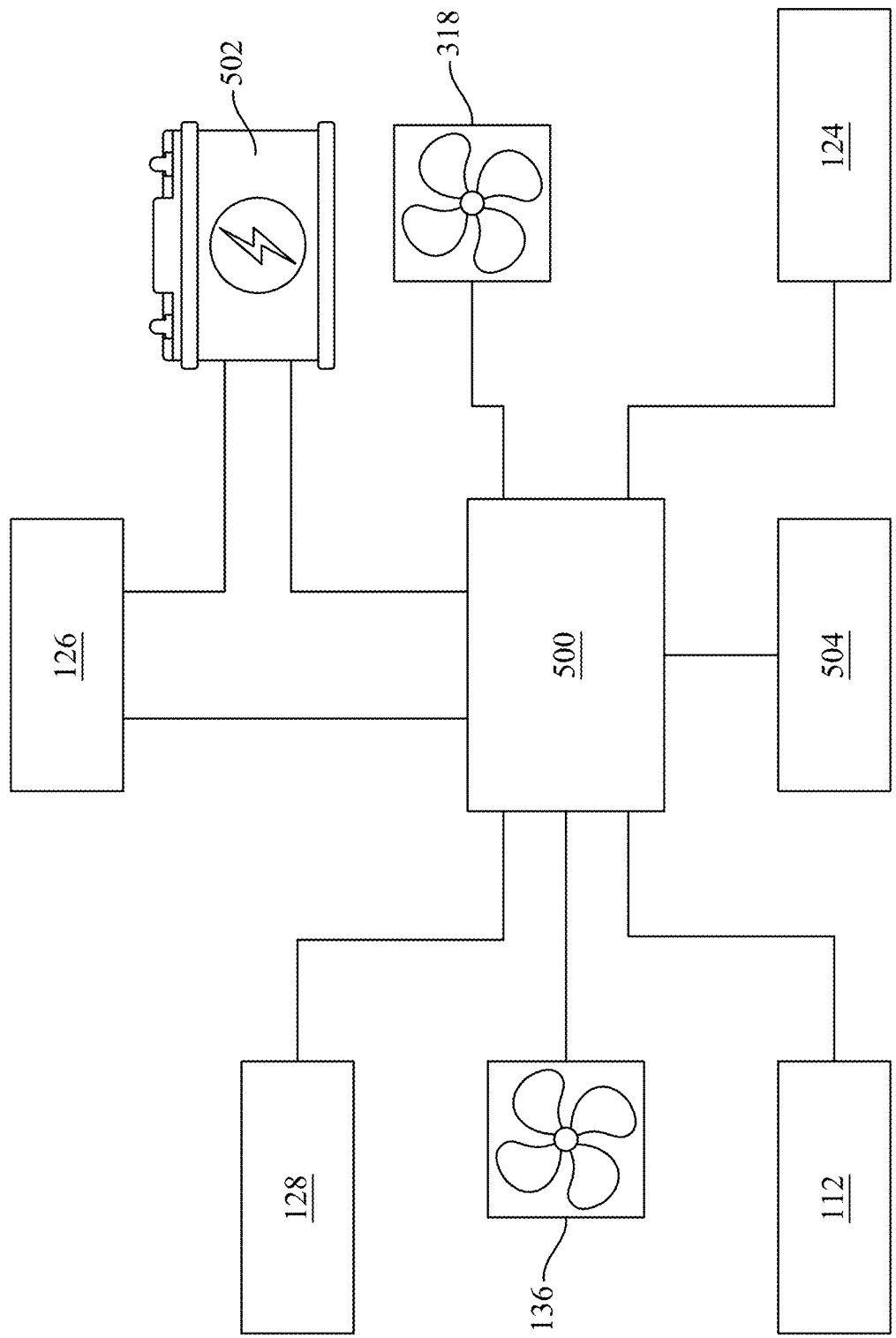
FIG. 5 is a block diagram illustrating connections between a controller and other components of the air cooling and heating system, according to certain embodiments.

FIG. 5 is a block diagram illustrating connections between a controller 500 of the system 100 and other components of the system 100. The controller 500 is connected to each of the PV-PCM wall unit 112, the PV-PCM roof unit 128, the plurality of Peltier based thermoelectric units 124, the plurality of Seebeck effect based thermoelectric units 126, the rechargeable battery 502, the first fan 136, and the second fan 318. The controller 500 is configured to control the PV-PCM wall unit 112, the PV-PCM roof unit 128, the plurality of Peltier based thermoelectric units 124, the plurality of Seebeck effect based thermoelectric units 126, and the first fan 136, and the second fan 318. In some aspects of the present disclosure, the PV-PCM roof unit 128 and the plurality of Seebeck effect based thermoelectric units 126 may power the rechargeable battery 502.

In some aspects of the present disclosure, the controller 500 is configured to generate a first set of fan drive signals to actuate the first fan 136 and generate a second set of fan drive signals to actuate the second fan 318. In some embodiments, generation of the first set of fan drive signals and the second set of fan drive signals may be based on a temperature value of the building interior "I". In some aspects, generation of the first set of fan drive signals and the second set of fan drive signals may be based temperature of the first photovoltaic phase change material 206 and the second photovoltaic phase change material 406. In some aspects, thermostats (not shown) may be coupled to each of the first photovoltaic phase change material 206 and the second photovoltaic phase change material 406 to sense an increase in temperature thereof. When the temperature of the first photovoltaic phase change material 206 and the second photovoltaic phase change material 406 increases beyond a predefined threshold, the controller 500 may be configured to actuate the first fan 136 and the second fan 318. In some aspects, the first fan 136 and the second fan 318 may have thermostatic control. In some aspects, the first fan 136 may be calibrated such that it automatically changes a speed thereof according to the temperature of the exterior environment to obtain homeostatic conditions. As such, the system 100 may adapt dynamically to the current environmental conditions.

In some aspects, the controller 500 is configured to provide the first electric current to each of the plurality of Peltier based thermoelectric units 124. Further, each of the plurality of Peltier based thermoelectric units 124 is configured to use the first electric current to generate a temperature differential between the first ceramic plate 302 and the second ceramic plate 304. In some aspects, the controller 500 may be electrically connected to motors in each of the first vent 134 and the second vent 316 and may be configured to generate motor drive signals to actuate the motors. In some aspects, the PV-PCM wall unit 112 may directly power the controller 500 and the motors. Alternatively, in some aspects, the rechargeable battery 502 may power each of the controller 500 and the motors.

When the PCM absorbs the heat from the PV cells, the first fan 136 serves to cool the PCM and syphon the heat through the air flowing via the air gap 118 and the second air duct 122. As the hot air is drawn out of the air gap 118 and the second air duct 122, cool air from the building interior "I" cools the PCM. The cool air was generated by the Peltier based thermoelectric units 124.

Figure 6:
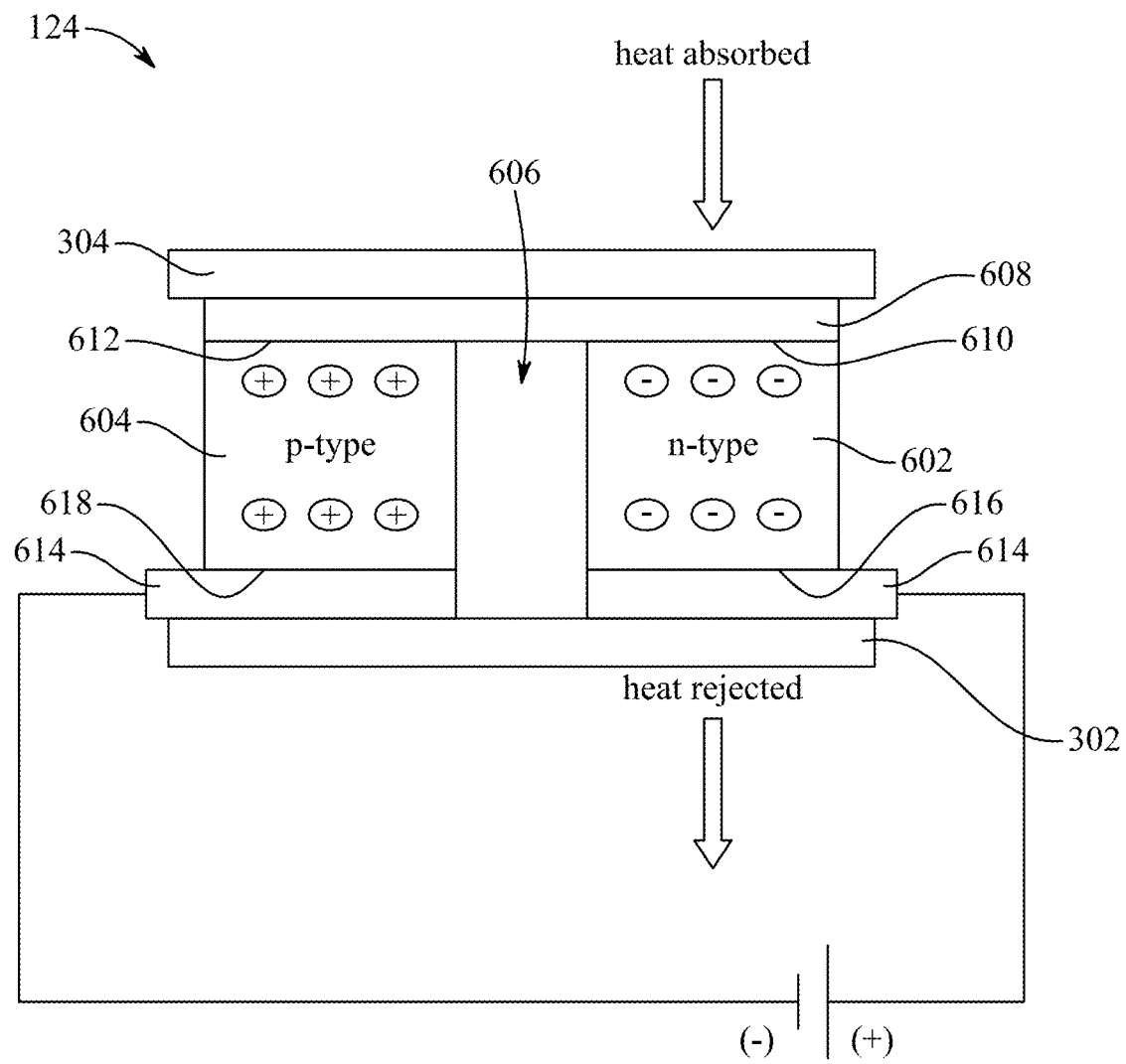
FIG. 6 is an exemplary illustration of a Peltier based thermoelectric unit of the air cooling and heating system, according to certain embodiments.

FIG. 6 is an exemplary illustration of the Peltier based thermoelectric unit 124. According to an aspect, each Peltier based thermoelectric unit 124 may be a semiconductor-based component, which is generally used as a heat pump. In some aspects, the Peltier based thermoelectric unit 124 includes an n-type semiconductor 602 in parallel with a p-type semiconductor 604, where the n-type semiconductor 602 is separated from the p-type semiconductor 604 by a space 606. A first metal surface 608 covers a first face 610 of the n-type semiconductor 602, the space 606, and a first face 612 of the p-type semiconductor 604. A second metal surface 614 is located opposite the first metal surface 608 and is configured to cover a second face 616 of the n-type semiconductor 602 and a second face 618 of the p-type semiconductor 604. In some aspects, each of the first metal surface 608 and the second metal surface 614 may be a copper plate. The first ceramic plate 302 is coupled to the second metal surface 614 and located in the first air stream 308 to heat the air flow, and the second ceramic plate 304 is coupled to the first metal surface 608 and located in the second air stream 312 to absorb heat from the air flow. As described earlier, each of the first ceramic plate 302 and the second ceramic plate 304 are maintained at different temperatures based on the desired temperature of the building interior "I". In the Peltier effect, a temperature difference is created between the junctions when electric current flows across the terminals. As such, a temperature gradient is created between the first ceramic plate 302 and the second ceramic plate 304. Such temperature gradient causes mobile charge carriers to migrate from a hot region to a cold region, thereby creating an electric potential. The electric current is received from the electricity generated by the PV-PCM wall unit 112. The electric current may be supplemented by energy stored in the rechargeable battery 502.

Figure 7:
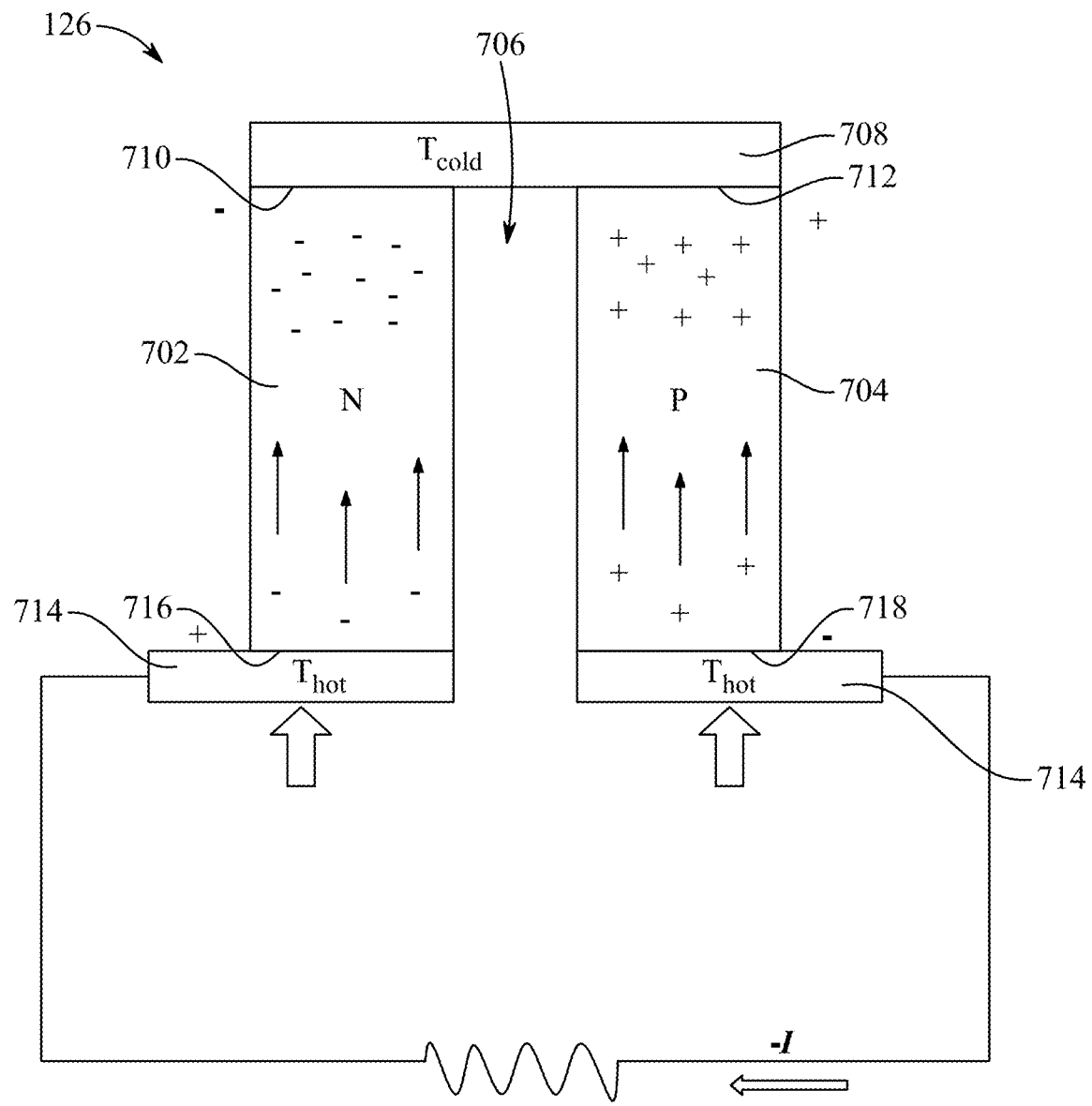
FIG. 7 is an exemplary illustration of a Seebeck effect based thermoelectric unit of the air cooling and heating system, according to certain embodiments.

FIG. 7 is an exemplary illustration of the Seebeck effect based thermoelectric unit 126. The Seebeck effect based thermoelectric unit 126 includes an n-type semiconductor 702 in parallel with a p-type semiconductor 704, where the n-type semiconductor 702 is separated from the p-type semiconductor 704 by a space 706. A first metal surface 708 covers a first face 710 of the n-type semiconductor 702, the space 706, and a first face 712 of the p-type semiconductor 704. A second metal surface 714 is located opposite the first metal surface 708 and is configured to cover a second face 716 of the n-type semiconductor 702 and a second face 718 of the p-type semiconductor 704. In some aspects, each of the first metal surface 708 and the second metal surface 714 may be a copper plate. Further, each Seebeck effect based thermoelectric unit 126 is mounted within the second air duct 122 so that the first metal surface 708 contacts a wall of the second air duct 122 which contacts the roof 110 and the second metal surface 714 extends into the first air stream 308. The Seebeck effect occurs when the two ends of a thermocouple are at different temperatures, which results in electricity flowing from the hot metal to the cold metal (such as the copper plate). In the winter, the circuitry can be reversed (e.g., by a switching function of the controller 500 connected to a thermostat 504) so that cold air flow from the exterior environment and from the rear of the PV panel (which does not need additional cooling) can be converted to warm air by the Seebeck effect of thermoelectric generator.

In some aspects, the plurality of Seebeck effect based thermoelectric units 126 are located in a series connection, where the series connection includes a positive terminal and a negative terminal. The rechargeable battery 502 is connected to the positive terminal and the negative terminal, and the thermoelectric power generated by the plurality of Seebeck effect based thermoelectric units 126 is stored by the rechargeable battery 502.

The output voltage $V_0$ and current $I_0$ of the Seebeck effect based thermoelectric units 126 may be calculated using:

$$V_0 = \frac{SN(T_c - T_h)}{1 + 2rl_c/l} \quad (1)$$

$$I_0 = \frac{SA(T_h - T_c)}{2\rho(n + l)(1 + 2rl_c/l)} \quad (2)$$

where, S is the Seebeck coefficient of the thermoelectric element, N the number of thermoelectric elements, l the length of each thermoelectric element, lc the thickness of the contact layer; $T_h$ and $T_c$ are the temperatures on the hot and cold sides of the thermoelectric unit, respectively; A is the cross-sectional area of the thermoelectric element, and p the electrical sensitivity.

In operation, the PV-PCM wall unit 112 and the PV-PCM roof unit 128 both provide electric energy to the Peltier based thermoelectric units 124, thus activating the first ceramic plate 302 and the second ceramic plate 304 thereof. The PV-PCM wall unit 112 absorbs incident solar radiation, thereby preventing penetration of heat into the building interior "I". When a voltage is applied across the Peltier based thermoelectric units 124, a temperature gradient is formed, known as the Peltier effect. The air flow entering the first air duct 120 via the second air flow passage "P2" is channeled through the first half 310 and the second half 314 of the first air duct 120. The air stream in contact with the second ceramic plate 304 is cooled, dehumidified, and supplied into the building interior "I". During such contact with the second ceramic plate 304, vapor present in the air stream may condense on the surface of the second ceramic plate 304. In some aspects, resulting condensate may be directed to a condensate reservoir (not shown). In some aspects, the collected condensate may be used to humidify the air stream supplied into the building interior "I". In some aspects, the collected condensate may be recycled for the building usage or can be drawn away from the building by a hose.

The air stream in contact with the first ceramic plate 302 is heated and channeled into the second air duct 122. During this process, the first ceramic plate 302 of each Peltier based thermoelectric unit 124 functions as a heat sink to transfer heat to the air flowing thereacross. When the cool and dehumidified air enters the air gap 118 from the building interior "I", heat from the PCM of the PV-PCM wall unit 112 may be absorbed by the cool and dehumidified air. As a result, temperature of the PV-PCM wall unit 112 is reduced, thereby increasing photovoltaic efficiency. Subsequently, the first fan 136 may be actuated to suction the hot air from the air gap 118 and the second air duct 122 and vent the hot air to the exterior environment. Operation of the second fan 318 for a time interval allows cold and dehumidified air to circulate through the building interior "I", thereby achieving the thermal comfort.

Figure 8:
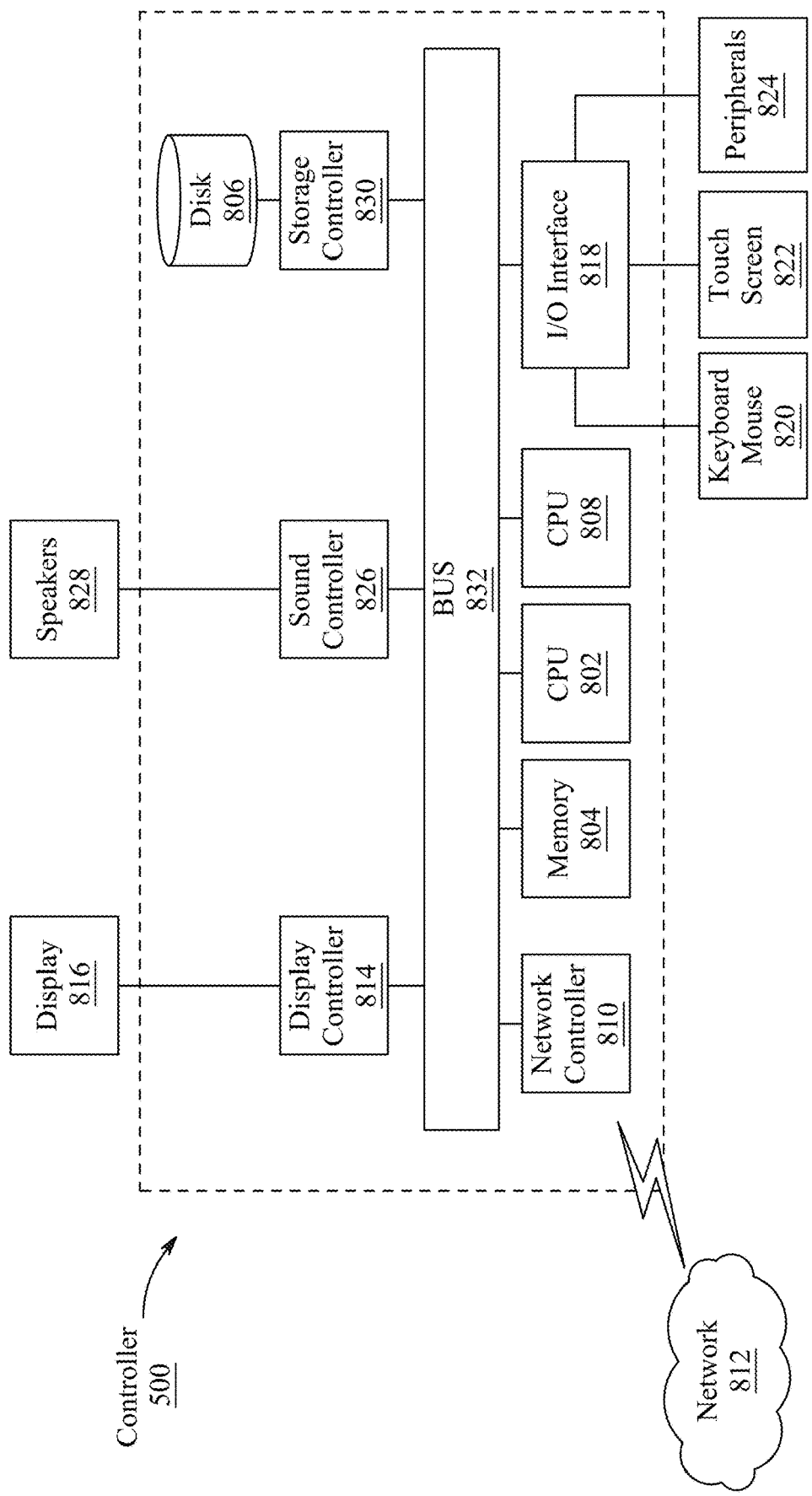
FIG. 8 is an illustration of distributed components which may share processing with the computing hardware, according to certain embodiments.

Next, further details of the hardware description of a computing environment according to exemplary aspects is described with reference to FIG. 8. In FIG. 8, the controller 500 is embodied as a computing device which includes a CPU 802 which performs the processes described above/below. The process data and instructions may be stored in memory 804. These processes and instructions may also be stored on a storage medium disk 806, such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 802, 808 and an operating system such as Microsoft Windows 7, Microsoft Windows 10, Microsoft Windows 11, UNIX, Solaris, LINUX, Apple MAC-OS, and other systems known to those skilled in the art.

The hardware elements in order to achieve the computing device may be realized by various circuitry elements, known to those skilled in the art. For example, the CPU 802 or the CPU 808 may be a Xenon or Core processor from Intel of America or an Opteron processor from AMD of America, or may be other processor types that would be recognized by one of ordinary skill in the art. Alternatively, the CPU 802, 808 may be implemented on an FPGA, ASIC, PLD or using discrete logic circuits, as one of ordinary skill in the art would recognize. Further, the CPU 802, 808 may be implemented as multiple processors cooperatively working in parallel to perform the instructions of the inventive processes described above.

The computing device in FIG. 8 also includes a network controller 810, such as an Intel Ethernet PRO network interface card from Intel Corporation of America, for interfacing with a network 812. As can be appreciated, the network 812 can be a public network, such as the Internet, or a private network such as an LAN or WAN network, or any combination thereof and can also include PSTN or ISDN sub-networks. The network 812 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 814, such as a NVIDIA GeForce GTX or Quadro graphics adaptor from NVIDIA Corporation of America for interfacing with a display 816, such as a Hewlett Packard HPL2445w LCD monitor. A general purpose I/O interface 818 interfaces with a keyboard and/or mouse 820 as well as a touch screen panel 822 on or separate from the display 816. General purpose I/O interface 818 also connects to a variety of peripherals 824 including printers and scanners, such as an OfficeJet or DeskJet from Hewlett Packard.

A sound controller 826 is also provided in the computing device, such as Sound Blaster X-Fi Titanium from Creative, to interface with speakers/microphone 828 thereby providing sounds and/or music.

A general purpose storage controller 830 connects the storage medium disk 806 with a communication bus 832, which may be an ISA, EISA, VESA, PCI, or similar, for interconnecting all of the components of the computing device. A description of the general features and functionality of the display 816, keyboard and/or mouse 820, as well as the display controller 814, the storage controller 830, the network controller 810, the sound controller 826, and the general purpose I/O interface 818 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (for example, chips), or the features may be combined in circuitry on a single chipset. The above-described hardware description is a non-limiting example of corresponding structure for performing the functionality described herein.

Figure 9:
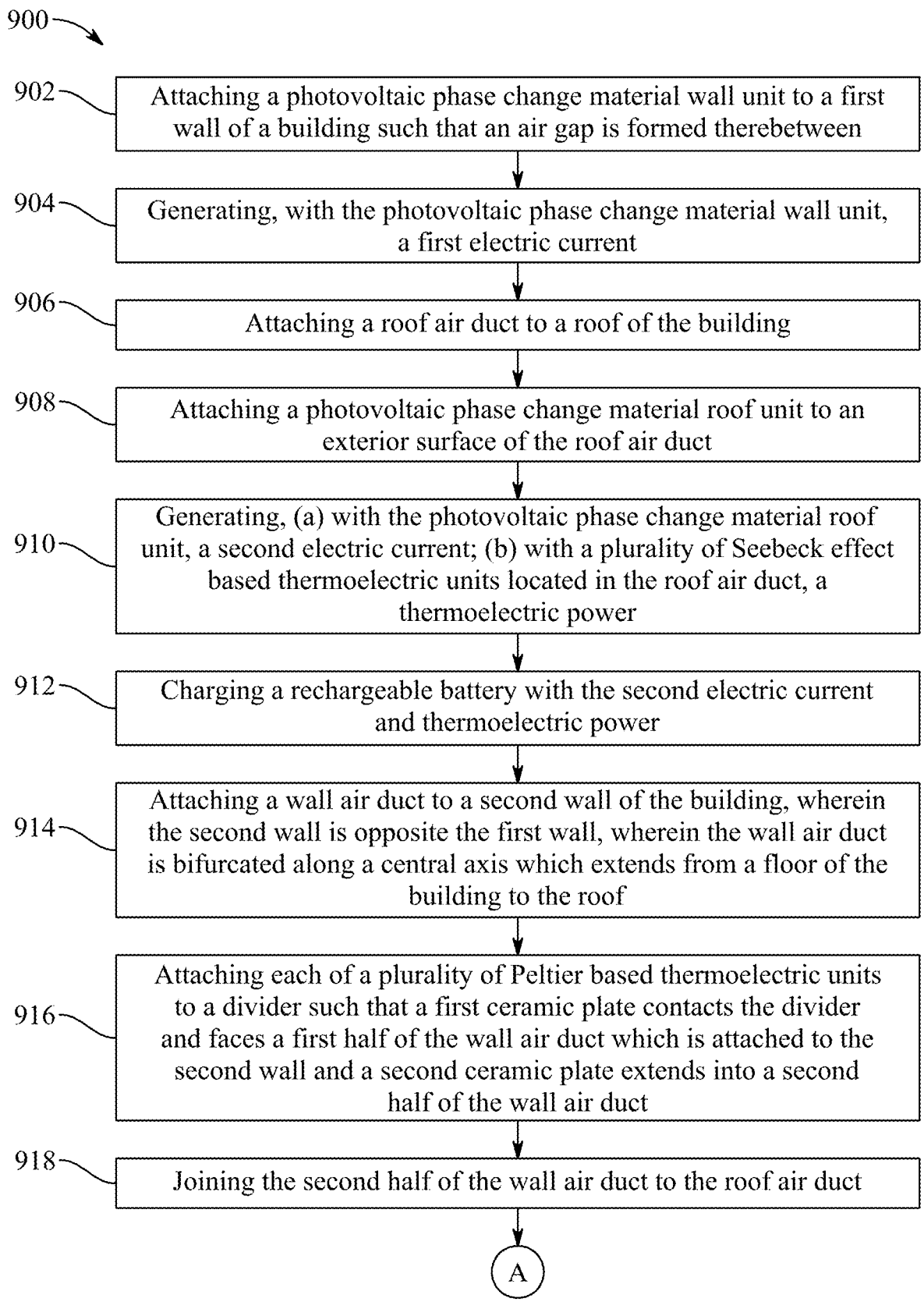
FIG. 9 is a flowchart of a method for controlling a temperature of the building, according an aspect of the present disclosure.
Figure 9:
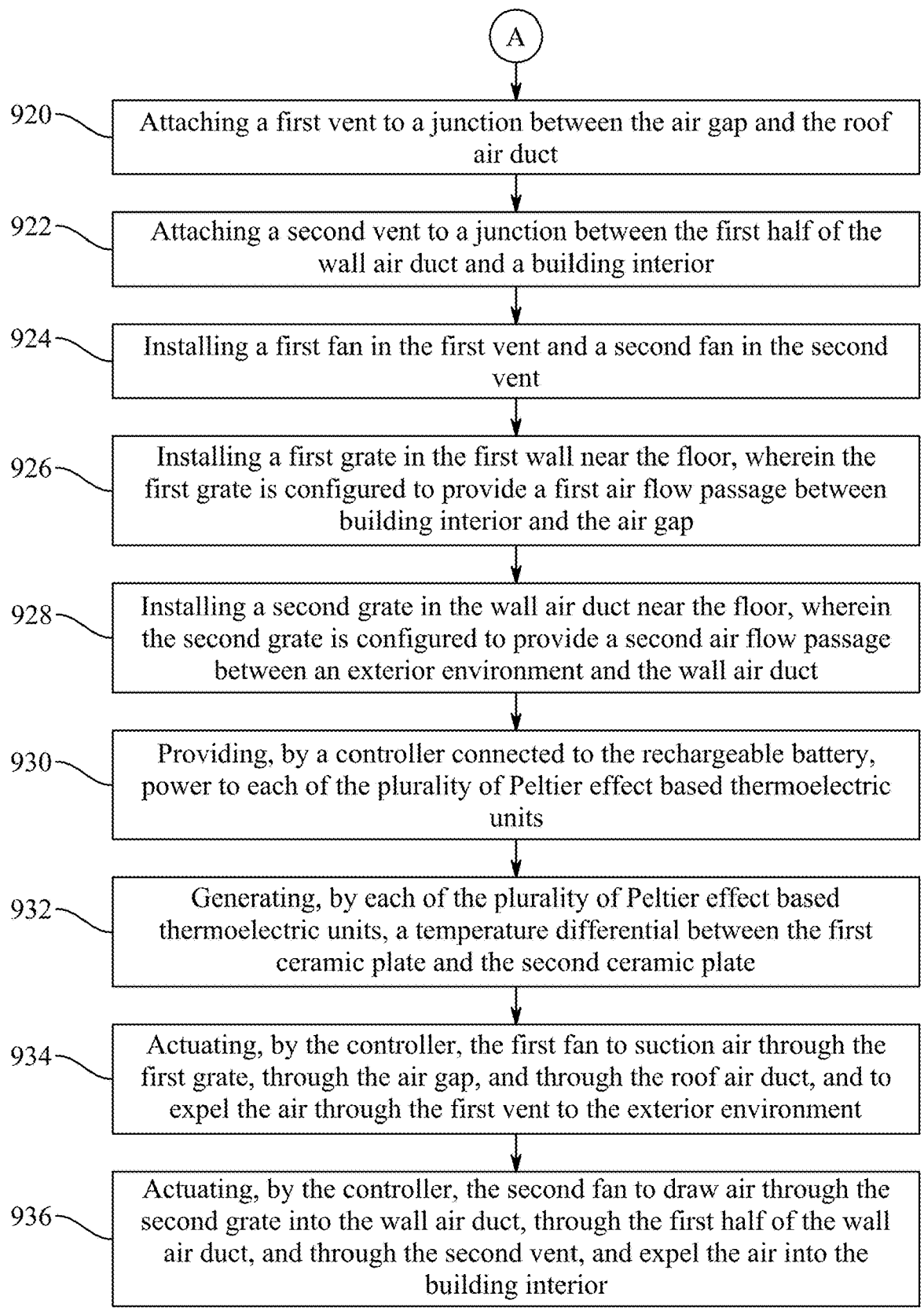

FIG. 9 illustrates a flowchart of a method 900 for controlling a temperature of the building. The steps of the method 900 are described with reference to FIG. 1 through FIG. 7. At step 902, the method 900 includes attaching the PV-PCM wall unit 112 to the first wall 104 of the building such that the air gap 118 is formed therebetween.

At step 904, the method 900 includes generating, with the PV-PCM wall unit 112, the first electric current.

At step 906, the method 900 includes attaching the roof air duct (alternatively referred to as the second air duct 122) to the roof 100 of the building.

At step 908, the method 900 includes attaching the PV-PCM roof unit 128 to the exterior surface of the second air duct 122.

At step 910, the method 900 includes generating, (a) the second electric current with the PV-PCM roof unit 128 and (b) the thermoelectric power with the plurality of Seebeck effect based thermoelectric units 126 located in the second air duct 122.

At step 912, the method 900 includes charging the rechargeable battery 502 with the second electric current and the thermoelectric power.

At step 914, the method 900 includes attaching a wall air duct (alternatively referred to as the first air duct 120) to the second wall 106 of the building. The second wall 106 is opposite the first wall 104, and the first air duct 120 is bifurcated along the central axis "C" thereof which extends from the floor 108 of the building to the roof 110.

At step 916, the method 900 includes attaching each of the plurality of Peltier based thermoelectric units 124 to the divider 306 such that the first ceramic plate 302 contacts the divider 306 and faces the first half 310 of the first air duct 120 and the second ceramic plate 304 extends into the second half 314 of the first air duct 120.

At step 918, the method 900 includes joining the second half 314 of the first air duct 120 to the second air duct 122.

At step 920, the method 900 includes attaching the first vent 134 to the junction between the air gap 118 and the second air duct 122.

At step 922, the method 900 includes attaching the second vent 316 to the junction between the first half 310 of the first air duct 120 and the building interior "I".

At step 924, the method 900 includes installing the first fan 136 in the first vent 134 and the second fan 318 in the second vent 316.

At step 926, the method 900 includes installing the first grate 130 in the first wall 104 near the floor 108, where the first grate 130 is configured to provide the first air flow passage "P1" between the building interior "I" and the air gap 118.

At step 928, the method 900 includes installing the second grate 132 in the first air duct 120 near the floor 108, where the second grate 132 is configured to provide the second air flow passage "P2" between the exterior environment and the first air duct 120.

At step 930, the method 900 includes providing, by the controller 500 connected to the rechargeable battery 502, power to each of the plurality of Peltier effect based thermoelectric units 124.

At step 932, the method 900 includes generating, by each of the plurality of Peltier effect based thermoelectric units 124, the temperature differential between the first ceramic plate 302 and the second ceramic plate 304.

At step 934, the method 900 includes actuating, by the controller 500, the first fan 136 to suction air through the first grate 130, through the air gap 118, and through the second air duct 122, and to expel the air through the first vent 134 to the exterior environment.

At step 936, the method 900 includes actuating, by the controller 500, the second fan 318 to draw air through the second grate 132 into the first air duct 120, through the first half 310 of the first air duct 120, and through the second vent 316, and expel the air into the building interior "I".

Although not explicitly illustrated through method blocks, the method 900 further includes attaching a thermostat 504 (see FIG. 5) to the building interior "I"; connecting the thermostat 504 to the controller 500; and controlling, by the controller 500, the temperature of the building interior "I" to a desired temperature by regulating a speed of the first fan 136 and a speed of the second fan 318.

In some aspects, the method 900 further includes providing, by the controller 500, the power at a first polarity to each of the plurality of Peltier effect based thermoelectric units 124 to cool the first ceramic plate 302 and heat the second ceramic plate 304, thus cooling the first air stream 308 in the first half 310 of the first air duct 120 and heating the second air stream 312 in the second half 314 of the first air duct 120, when the temperature of the building interior is less than the desired temperature.

In some aspects, the method 900 further includes providing, by the controller 500, the power at a second polarity to each of the plurality of Peltier effect based thermoelectric units 124 to heat the first ceramic plate 302 and cool the second ceramic plate 304, thus heating the first air stream 308 in the first half 310 of the first air duct 120 and cooling the second air stream 312 in the second half 314 of the first air duct 120, when the temperature of the building interior is greater than the desired temperature.

In some aspects, the method 900 further includes generating heat in the air gap 118 by converting, by a plurality of array of solar cells sandwiched between the first glazed cover 204 and the first photovoltaic phase change material 206 of the PV-PCM wall unit 112, solar radiation to the first electric current. The method 900 further includes absorbing the heat by the first photovoltaic phase change material 206 and cooling the first photovoltaic phase change material 206 by the air suctioned through the first grate 130 into the air gap 118.

In some aspects, the method 900 further includes generating heat in the second air duct 122 by converting, by a plurality of array of solar cells sandwiched between the second glazed cover 404 and the second photovoltaic phase change material 406 of the PV-PCM roof unit 128, solar radiation to the second electric current. The method 900 further includes absorbing the heat by the second photovoltaic phase change material 406 and cooling the second photovoltaic phase change material 406 by the air suctioned through the second grate 132, the second half 314 of the first air duct 120, and the second air duct 122 by the first fan 136.

In some aspects, the method 900 further includes converting, by the plurality of Seebeck effect based thermoelectric units 126 located in the second air duct 122, the heat differential between a temperature of the air flow in the second air duct 122 and a temperature of the surface of the second air duct 122 which contacts the roof 110 to the thermoelectric power.

With the system and the methods of the present disclosure, the thermal load of the building can be reduced to approximately 30%-35%, up to approximately 4513 kWh/ energy can be saved per year, and the carbon dioxide emissions can be reduced to approximately 43t.

Obviously, numerous modifications and variations of the present disclosure are possible in light of the above teachings. It is therefore to be understood that within the scope of the appended claims, the invention may be practiced otherwise than as specifically described herein.

An experiment and data collection was conducted using a single-room house facility, where the dimensions of the single-room house facility were 2 m (width, X)×2 m (depth, Y)×2 m (height, Z). Thermo-physical properties of the single-room house facility are presented in Table-1 below. All external walls of the single-room house facility were three-layered with a middle layer composed of 20 cm thick bricks. Both side walls were plastered, where a plaster thickness was 1.3 cm for an inside layer and 1.8 cm for an outside layer. Gypsum board with a dimension of 1.828 m×1.219 m×0.0063 m was used for the ceiling. A window on the north-west wall was 0.304 m high and 0.22 m wide, which was made of plywood with a thickness of 2.2 cm. The windows had no overhangs over it. The single-room house facility had a single steel door, which was located on the north-west wall with a dimension of 1.5 m height and 0.821 m width. The door was made of 0.45 cm thick GI metal sheet.

TABLE-1

Thermo-physical properties of the single-room house facility

| Material | Density (kg/m$^3$) | Specific heat (kJ kg$^{-1}$ K$^{-1}$) | Thermal conductivity (W m$^{-1}$ K$^{-1}$) |
|---|---|---|---|
| Brick tile | 1892 | 0.88 | 0.798 |
| Mud brick | 1731 | 0.88 | 0.750 |
| Soil | 1622 | 0.88 | 0.519 |
| Cement plaster | 1762 | 0.84 | 0.721 |
| Cement mortar | 1648 | 0.92 | 0.719 |
| Limestone tile | 2420 | 0.84 | 1.800 |
| Sand grave | 2240 | 0.84 | 1.740 |
| GI sheet | 7520 | 0.50 | 61.060 |
| Roof tile | 2531 | 1.4253 | 0.632 |

Figure 10A:
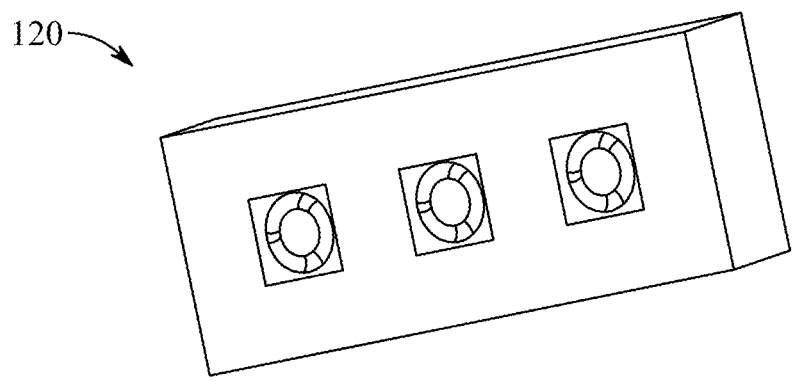
FIG. 10A illustrates a first perspective view of the first air duct 120, according to certain embodiments.
Figure 10B:
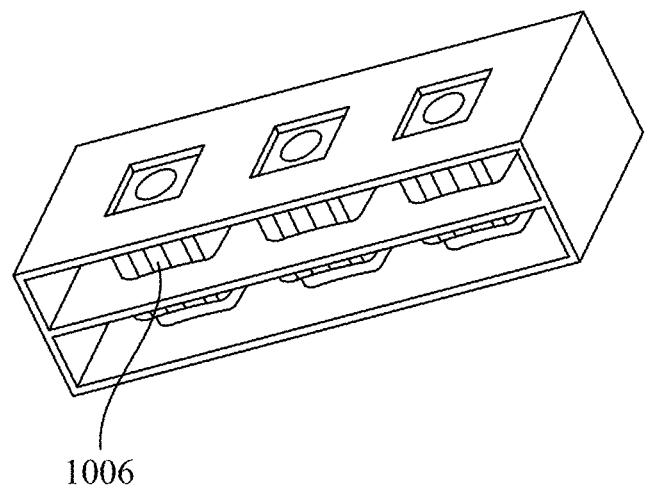
FIG. 10B illustrates a second perspective view of the first air duct 120, according to certain embodiments.
Figure 10C:
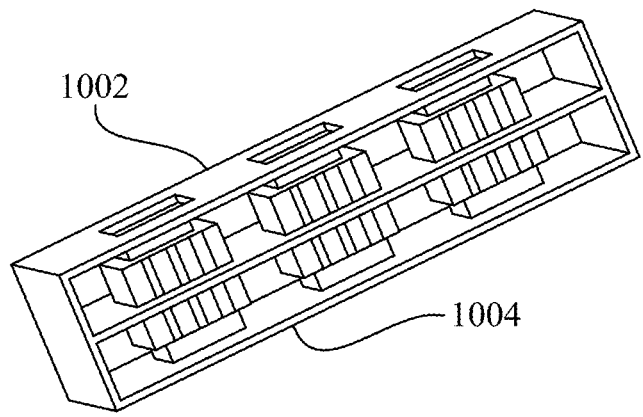
FIG. 10C illustrates a third perspective view of the first air duct 120, according to certain embodiments.
Figure 11A:
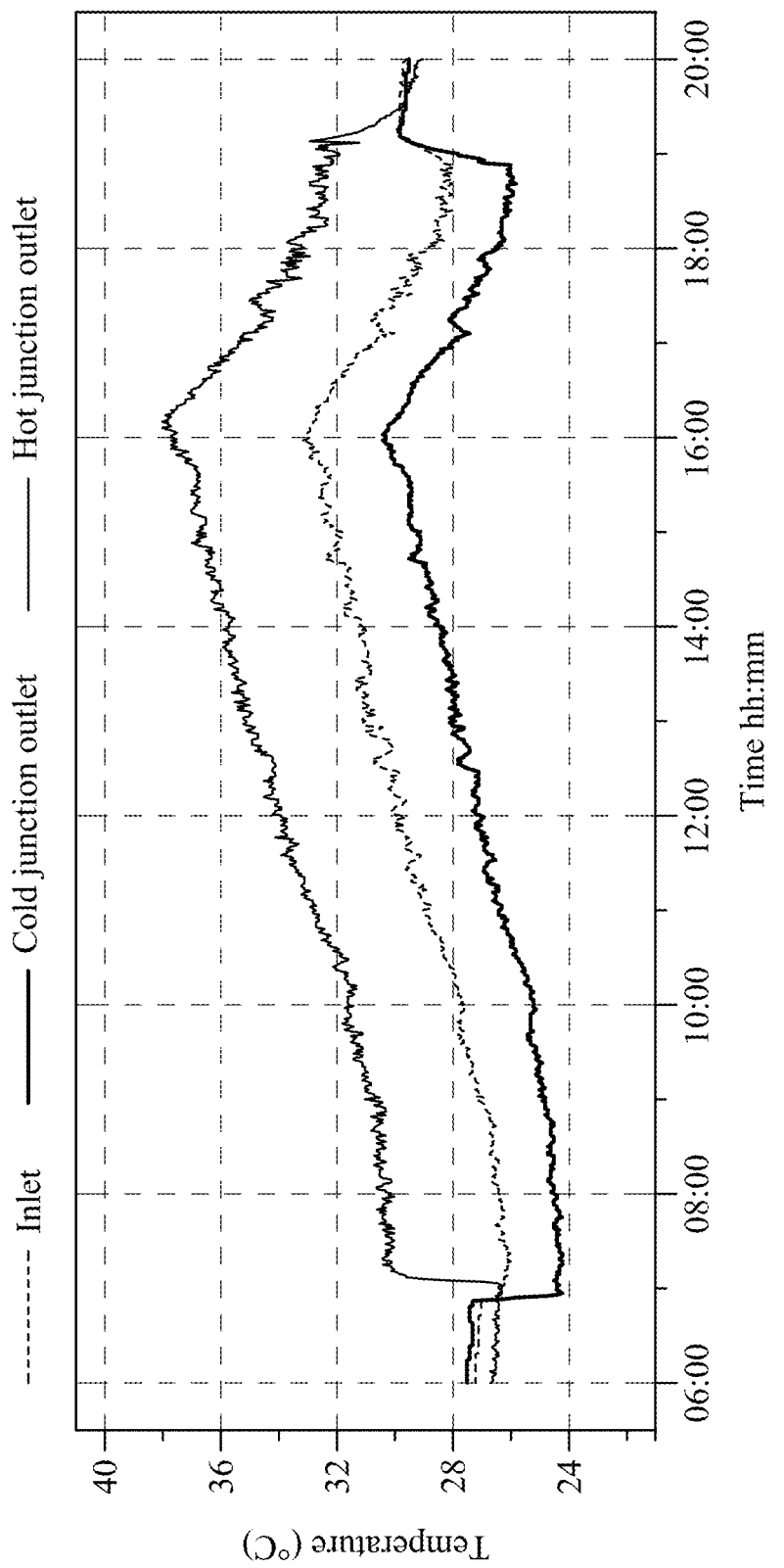
FIG. 11A is a graph illustrating behavior of thermoelectric air duct unit at 4 amps operating current with respect to temperature and time, according to certain embodiments.
Figure 11B:
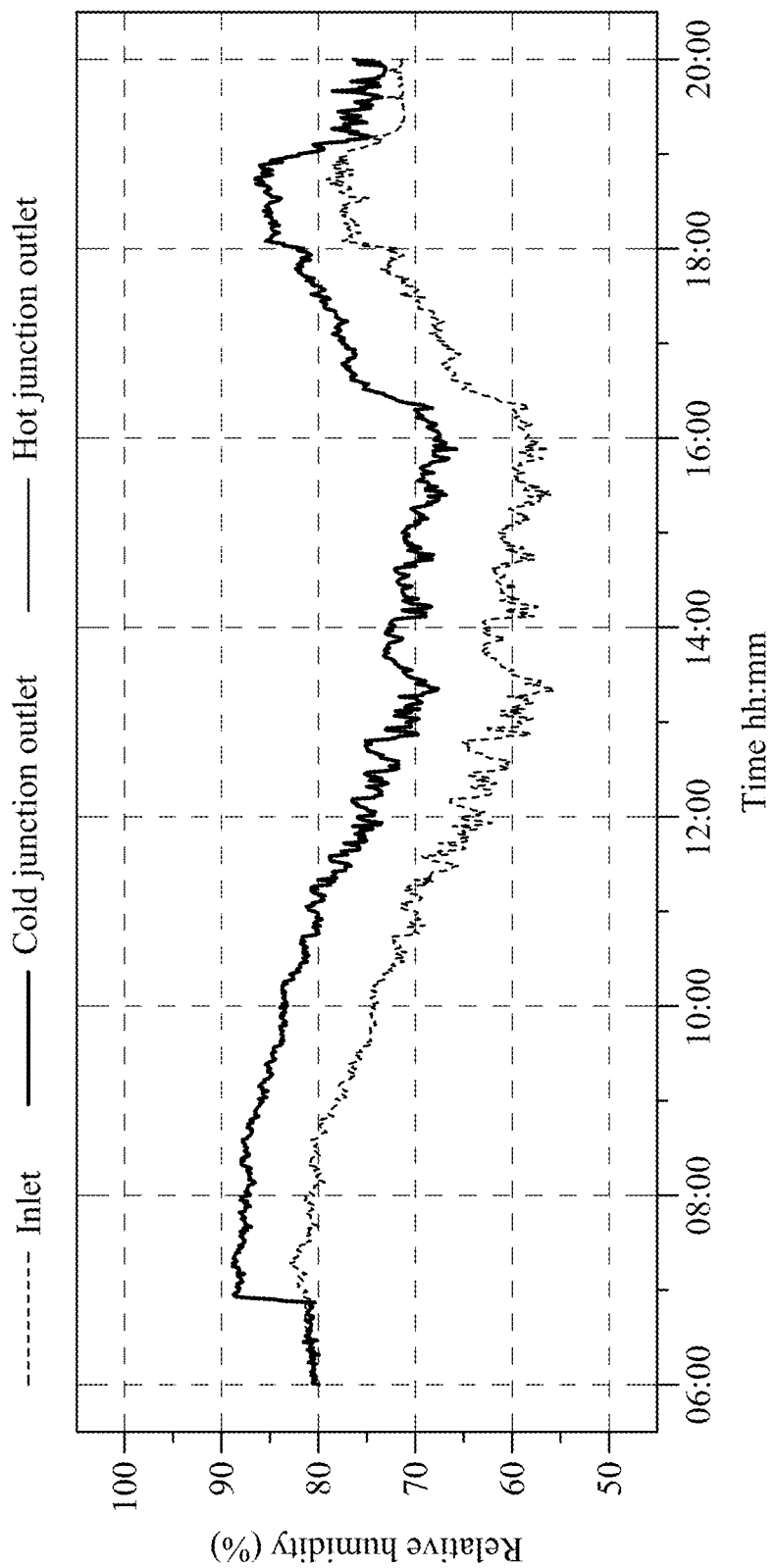
FIG. 11B is a graph illustrating behavior of the thermoelectric air duct unit at 4 amps operating current with respect to relative humidity and time, according to certain embodiments.
Figure 11C:
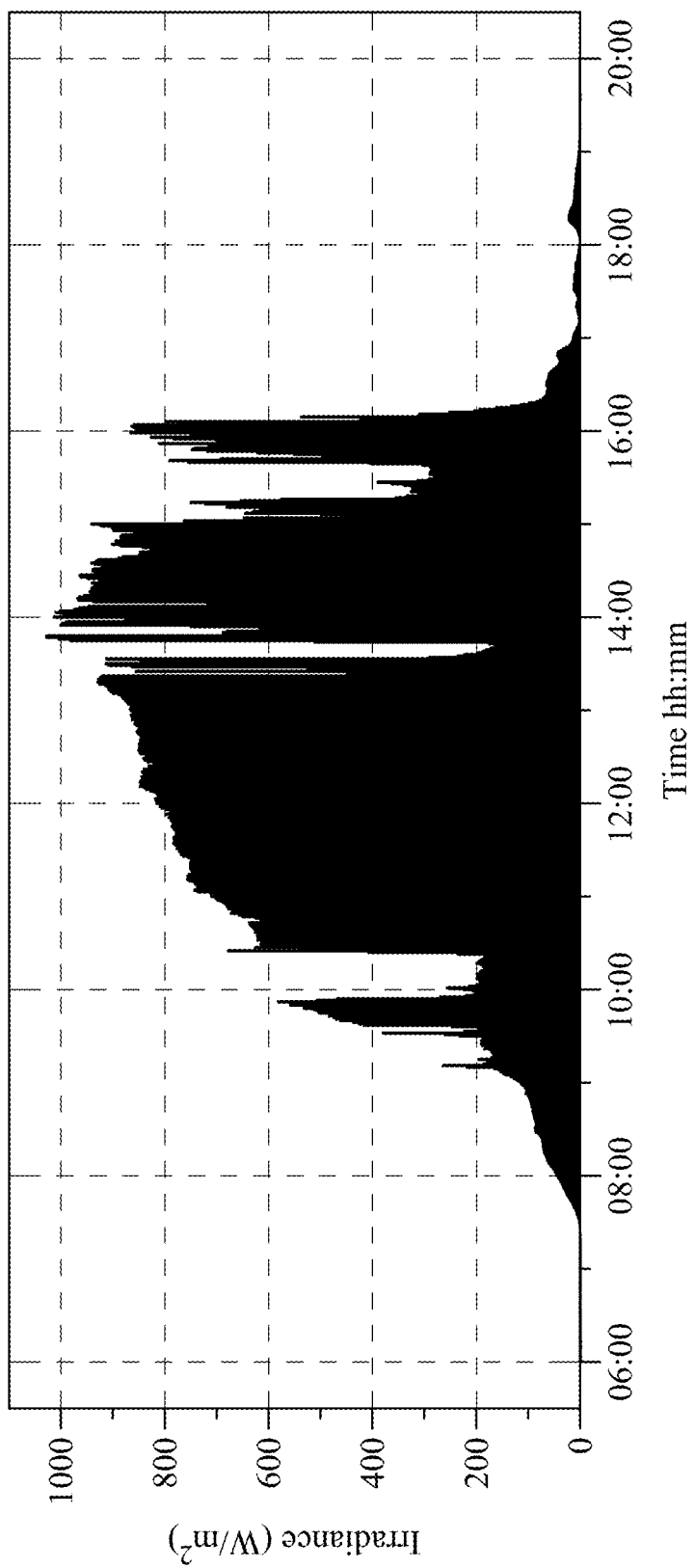
FIG. 11C is a graph illustrating behavior of the thermoelectric air duct unit at 4 amps operating current with respect to irradiation and time, according to certain embodiments.
Figure 12A:
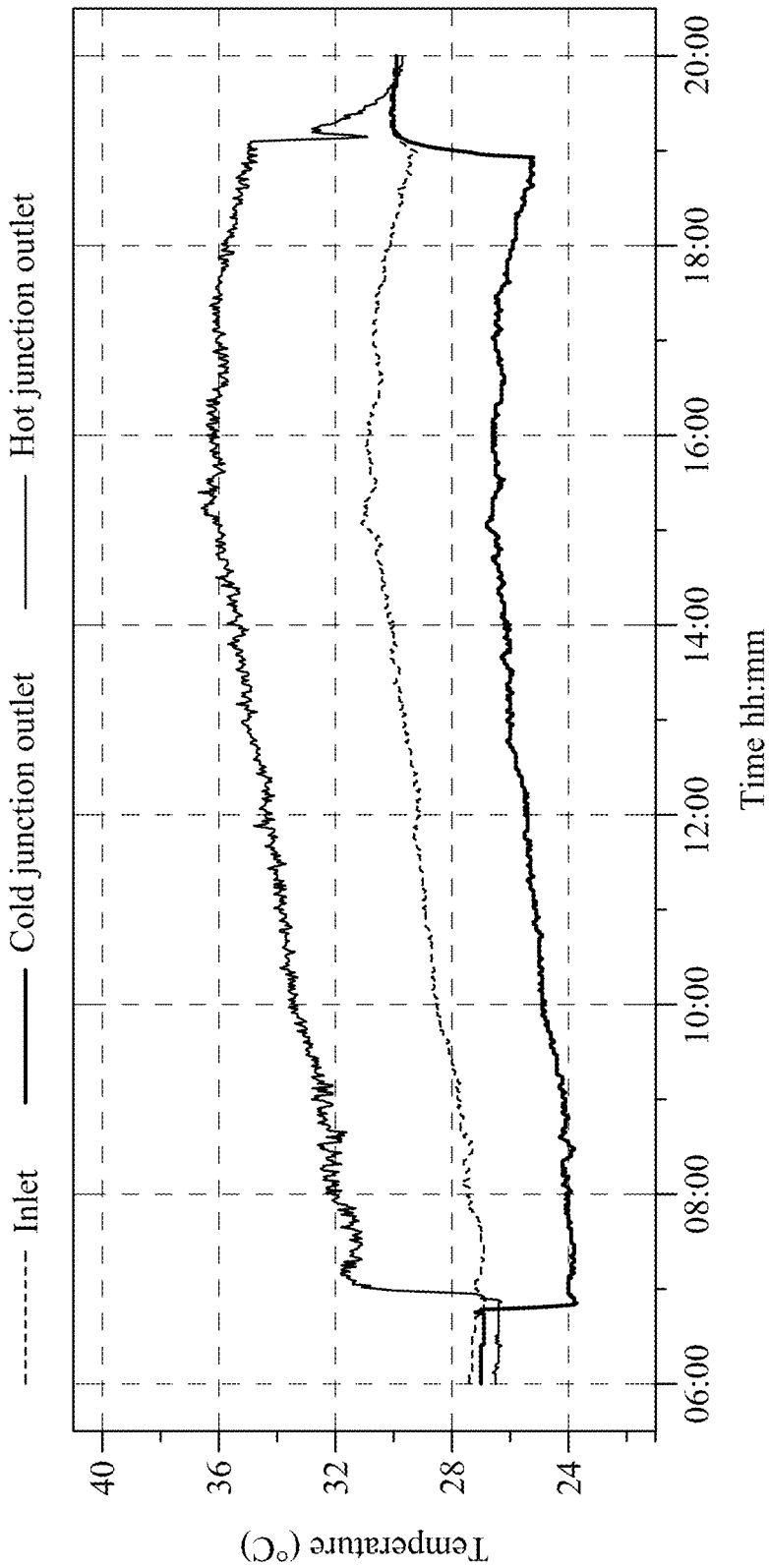
FIG. 12A is a graph illustrating behavior of the thermoelectric air duct unit at 5 amps operating current level with respect to temperature and time, according to certain embodiments.
Figure 12B:
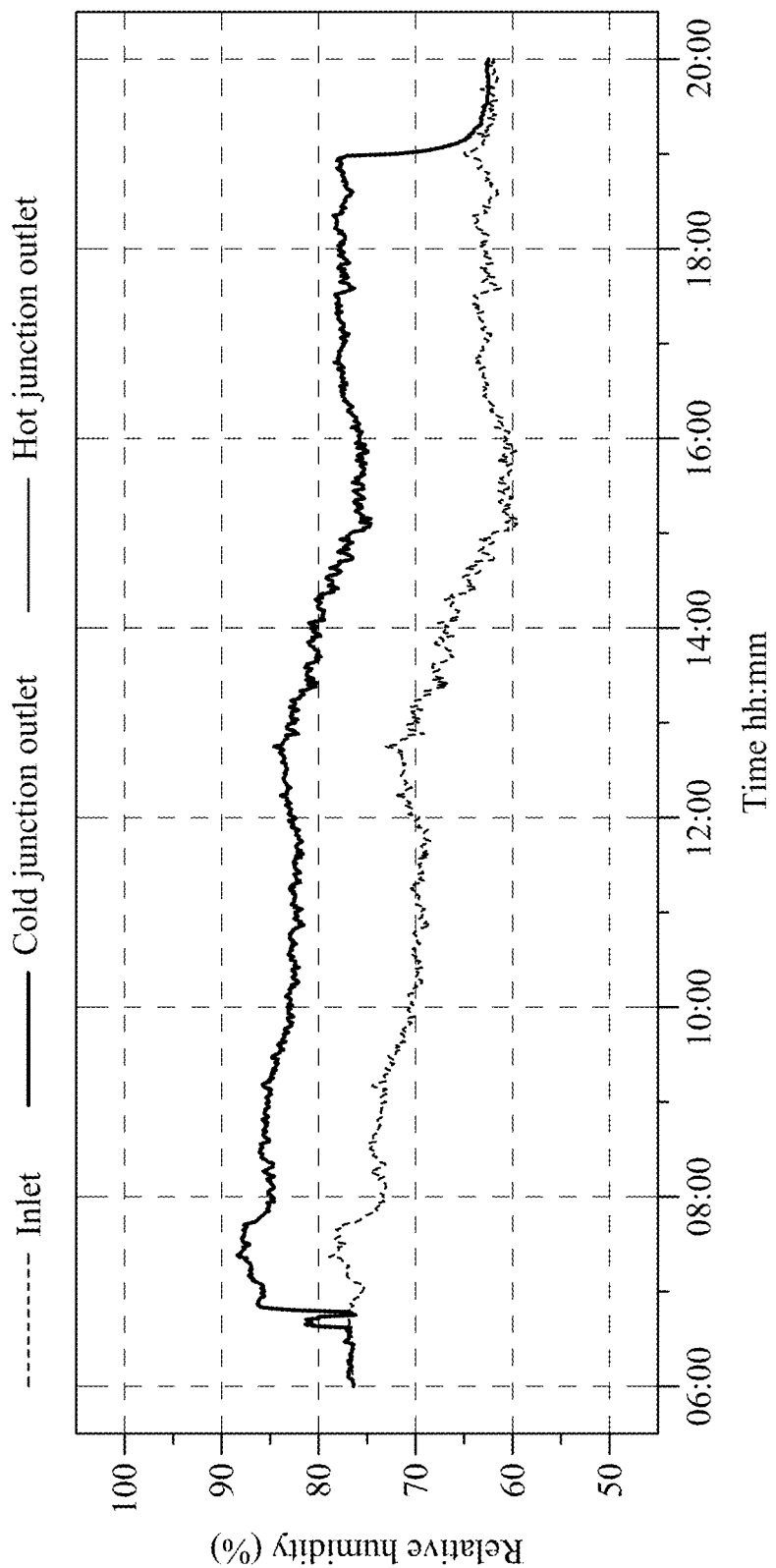
FIG. 12B is a graph illustrating behavior of the thermoelectric air duct unit at 5 amps operating current level with respect to relative humidity and time, according to certain embodiments.
Figure 12C:
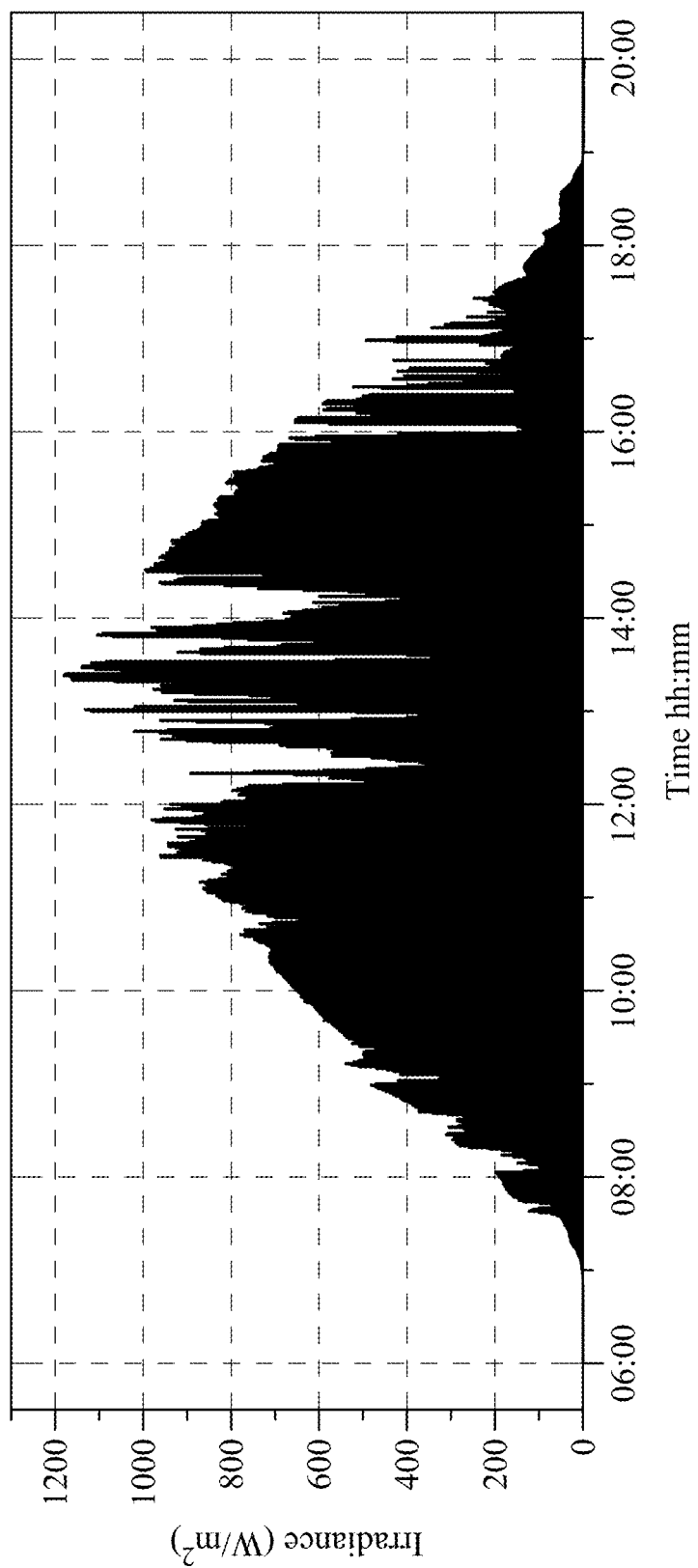
FIG. 12C is a graph illustrating behavior of the thermoelectric air duct unit at 5 amps operating current level with respect to irradiation and time, according to certain embodiments.
Figure 13A:
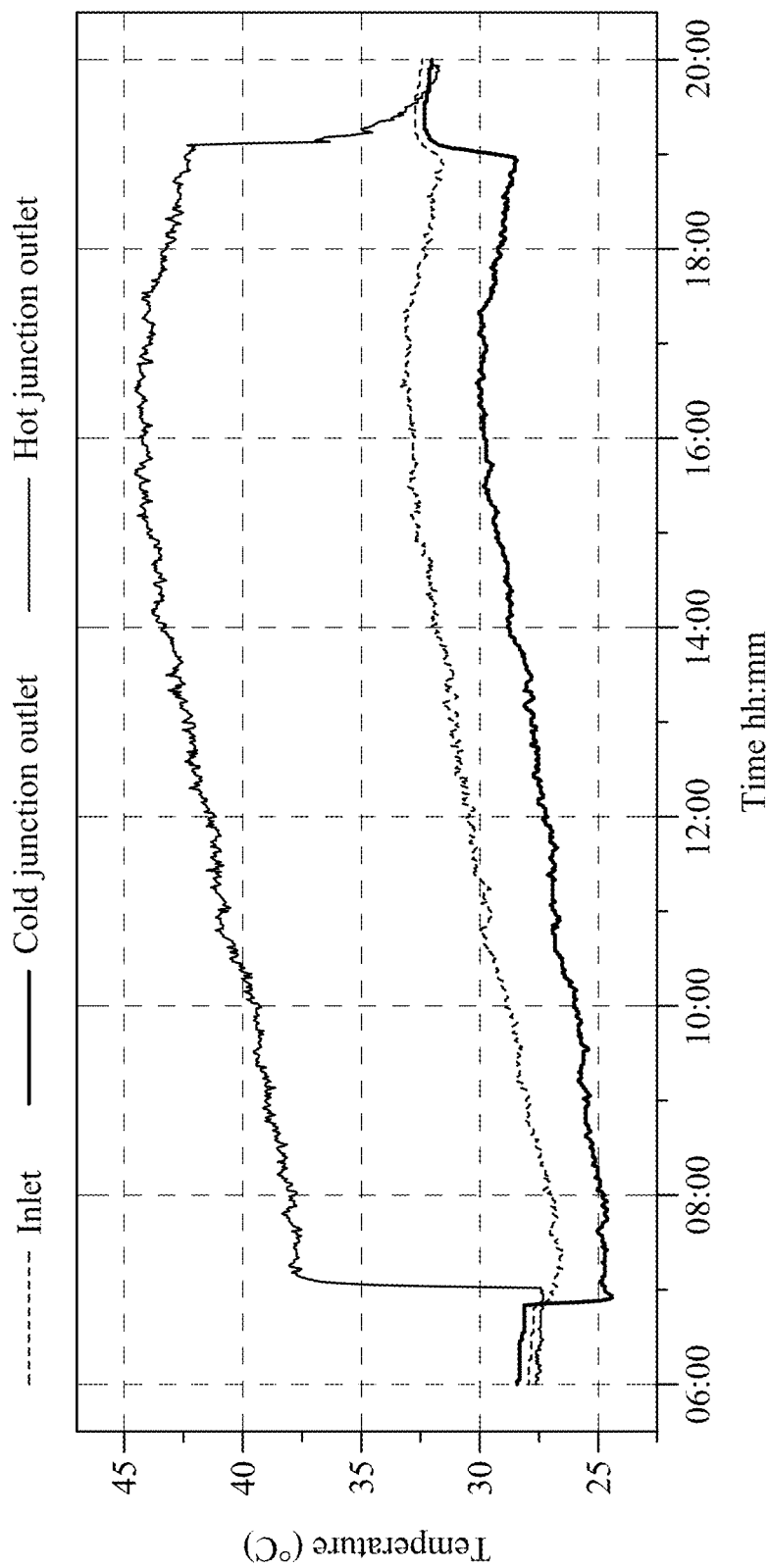
FIG. 13A is a graph illustrating behavior of the thermoelectric air duct unit at 6 amps operating current level with respect to temperature and time, according to certain embodiments.
Figure 13B:
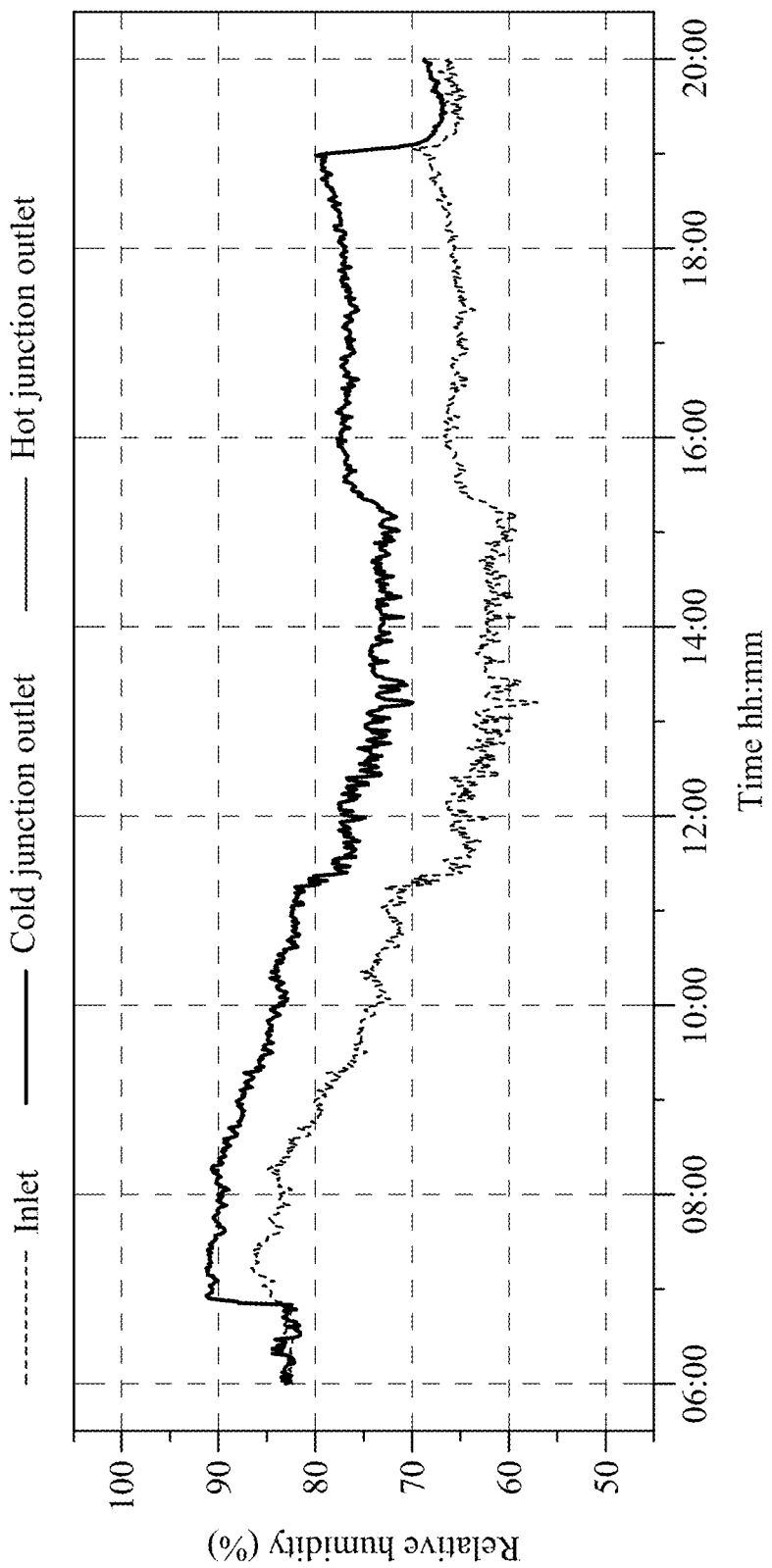
FIG. 13B is a graph illustrating behavior of the thermoelectric air duct unit at 6 amps operating current level with respect to relative humidity and time, according to certain embodiments.
Figure 13C:
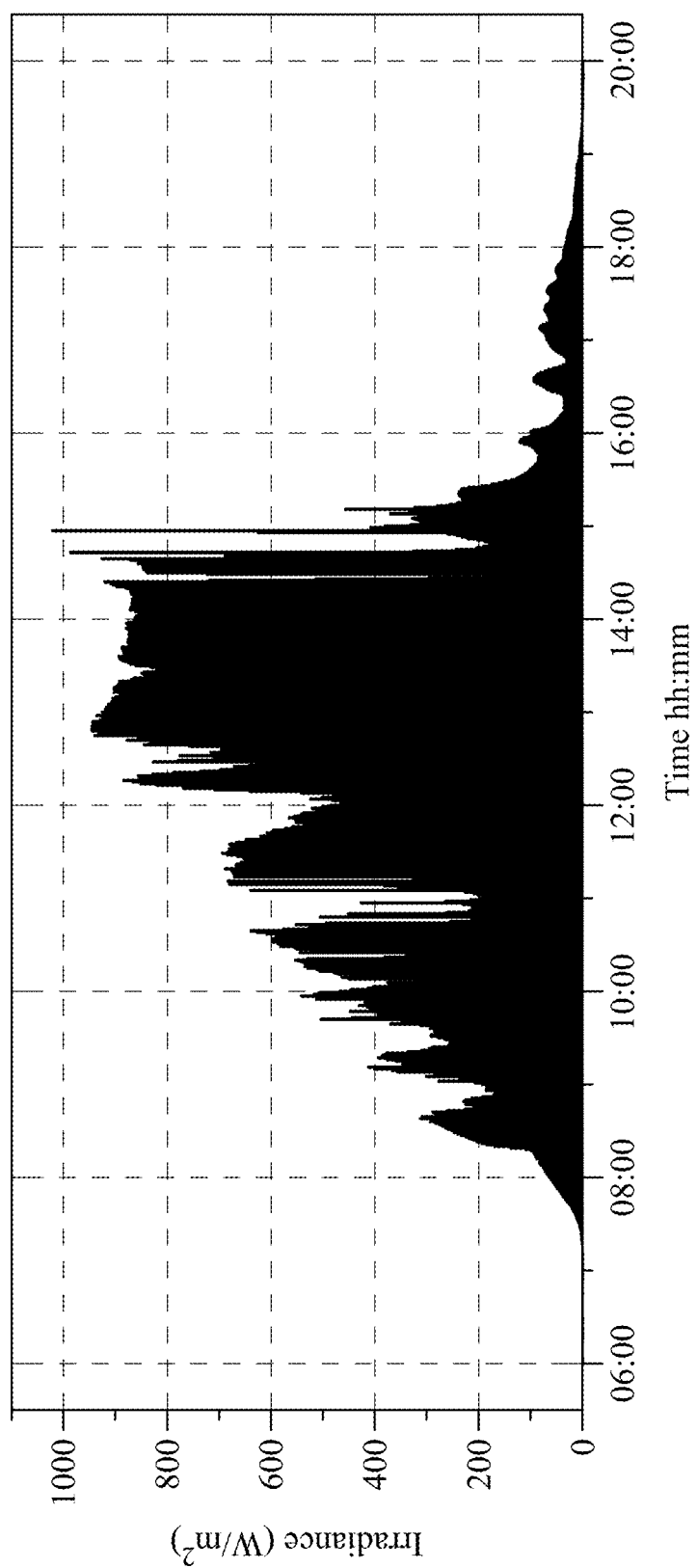
FIG. 13C is a graph illustrating behavior of the thermoelectric air duct unit at 6 amps operating current level with respect to irradiation and time, according to certain embodiments.

FIG. 10A, FIG. 10B, and FIG. 10C illustrates views of a prototype of the Peltier based thermoelectric units 124 installed in a first air duct (equivalent to the first air duct 120 of FIG. 1) used in the experiment. As can be seen in FIG. 1 and FIG. 10, the first air duct 120 includes multiple thermoelectric units (referred to as the Peltier based thermoelectric units 124 in the present disclosure), multiple fan units (such as the second fan 318) to suction air through the second half 314 of the first air duct 120, a hot side 1002 and a cold side 1004. A heat sink 1006 is coupled to the hot side 1002 to transfer heat to the air flowing thereacross. The hot side 1002 corresponds to the side having the first ceramic plate 302 and the cold side 1004 corresponds to the side having the second ceramic plate 304. The first air duct 120 included an aluminum sheet housing supported by a frame and wrapped with insulation sheet. The first air duct 120 was divided into two compartments, where the air was cooled in one compartment and warmed in the other compartment by the thermoelectric units.

A thin layer coating of thermally conductive grease was applied on both the hot side 1002 and the cold side 1004 of thermoelectric units for proper dissipation and absorption of heat into the surrounding medium. Both the hot side 1002 and the cold side 1004 of the duct compartments were fitted with an axial-flow fan (such as the second fan 318). The fans helped to enhance the performance of the thermoelectric units by controlling the velocity of the air flow to 2.5 m/s inside the cold side 1004 of the first air duct 120. The fans were connected to a speed controller (such as the controller 500) to control the speed thereof. The first air duct 120 was insulated with an aluminium foil to prevent air leakage and thermal losses, which may degrade the performance of the thermoelectric units. Dimensions of the thermoelectric units were chosen based on an aspect ratio criteria, which is a ratio of the dimensions of the two adjacent sides of a rectangular duct. In accordance with ASHRAE Standard 62.2, the dimensions were in the ratio of 4:1, which have less friction, less energy consumption, less metal sheet, and inexpensive.

Mounting of PV phase change material wall unit 112 on the first wall 104:

A supporting framework made up of aluminum, having a facility for rotation, was used for mounting three PV phase change material wall units 112, each having a capacity 220 Wp, on a south wall (such as the first wall 104) of the building. A perspex sheet was installed at the center of the first air duct 120 that connects to the single-room house facility, which consists of a total number of three (TEC1-12730) thermoelectric units. Specifications of the thermoelectric units are presented in Table-2 below.

TABLE 2

Properties of Thermoelectric units

| Type | Dimension (mm) | N | $I_{max}$ (A) | $U_{max}$ (V) | $Q_{cmax}$ (W) | $T_{max}$ (° C.) | $R_{TE}$ (Ω) | $S_{TE}$ (V/K) | $K_{TE}$ (W/° C.) |
|---|---|---|---|---|---|---|---|---|---|
| TEC 1-12730 | 62 × 62 × 4.8 | 127 | 30 | 15.4 | 266.7 | 68 | 0.27 | 0.051 | 0.5177 |

In the experiment, three thermoelectric units were arranged in three columns as shown in FIG. 10A, 10B, 10C. The structure of a thermoelectric unit was described in "Study of Thermoelectric Air Duct Cooling/Heating System for Building Energy Efficient", by K. Irshad, S. Algarni, published in 2019 by ASHRAE, 7th International Conference on Energy Research and Development, which is incorporated herein by reference in its entirety. The columns were connected in parallel and the thermoelectric units in each column were internally connected in series. For each series, the positive wires of the thermoelectric units were connected to the negative wires of the subsequent thermoelectric units while the positive wires at the end of each series were connected to a bus bar (positive bar) and the negative wires at the end were connected to another Bus bar (negative bar). The positive bar was then connected to the positive terminal of the power supply, whereas the negative bar was connected to the negative terminal of the battery.

To provide sufficient cooling to the first air duct 120, suitable thermoelectric units were selected to provide the cooling load required by the single-room house facility. The single-room house facility peak cooling load was set as 389 W prior to installation of the air duct. The thermoelectric units were tested by supplying different input currents and it was noted that at an applied voltage of 10 V and an input current of 3 A, each thermoelectric unit generates 50 W cooling power. Thus, for a cooling load of 389 W, the number of thermoelectric units required was 8 units, which can provide up to 400 W of cooling power at the given configuration, which was slightly higher than the required cooling load. As this air-cooling system is used for personalized cooling and not for full building cooling, only three thermoelectric units were used in the duct system. The ambient air was circulated inside the single-room house facility via the first air duct 120 installed on the north side (second wall 106) of the window. When the DC power supply was turned on, a current was applied across the thermoelectric units, which created a temperature difference between the cold and hot sides thereof. The heat sinks attached to the hot side of the thermoelectric units have eight fins, each 1 mm thick, 75 mm in length and 15 mm in height. To improve the heat transfer between the thermoelectric units and the heat sinks, thermal paste was applied. The heat sinks were cooled by forced convection using an exhaust fan with power 5 W, whereby the speed was adjusted using a speed regulator.

The first air duct 120 with the thermoelectric units was tested with 3A, 4A, 5A and 6A operating current levels by maintaining the same flow rate of air distribution at the cold junction and heat dissipation at the hot junction. Behaviours of the first air duct 120 with the thermoelectric units at 4 amps, 5 amps and 6 amps operating current levels are depicted in FIG. 11A through FIG. 13C. As the first air duct 120 with the thermoelectric units was switched on at 7 AM, the Peltier effect was observed, and the outlet temperature of the hot and cold junctions changed significantly. During the operation of the system 100, heat absorption processed by the cold side 1004 of thermoelectric units caused the drop in air temperature. This heat was then propelled out of the first air duct 120 by the hot junction fans. As a result, the outlet temperature of the hot junction increased. The variation of temperature and relative humidity was strongly dependent on the ambient condition. Results showed that the temperature and relative humidity difference were at the greatest during the peak operating hours, which is between 12:00 pm to 4:00 pm, as compared to the initial and final hours of operation.

During 3 amps operating current level operation, the temperature reduction at the cold junction, $\Delta T\_CJ$ was 2.50° C. and the relative humidity changes, $\Delta RH$ increased by 9.35% averagely. As the operating current level was increased, results showed that the $\Delta T\_CJ$ and the $\Delta RH$ increased as well and achieved a maximum value at the 5 amps operating current level, which is 4.6° C. and 15.3% respectively. The increment of current level causes the pumping of heat carrier in the thermoelements of thermoelectric units through the pores of material increased. Hence, a greater amount of heat was absorbed from the inlet air and released through the hot junction. As the current level reached 6 amps, it was found that the $\Delta T\_CJ$ and the $\Delta RH$ reduced to 2.94° C. and 11% respectively. The downturn performance of the first air duct 120 with the thermoelectric units was due to the Joule effect in the thermoelectric units. The higher the current level, the greater the Joule heat created within the thermoelectric units and eventually, this heat becomes the obstacle to escalate the Peltier cooling of the thermoelectric units.

Figure 14:
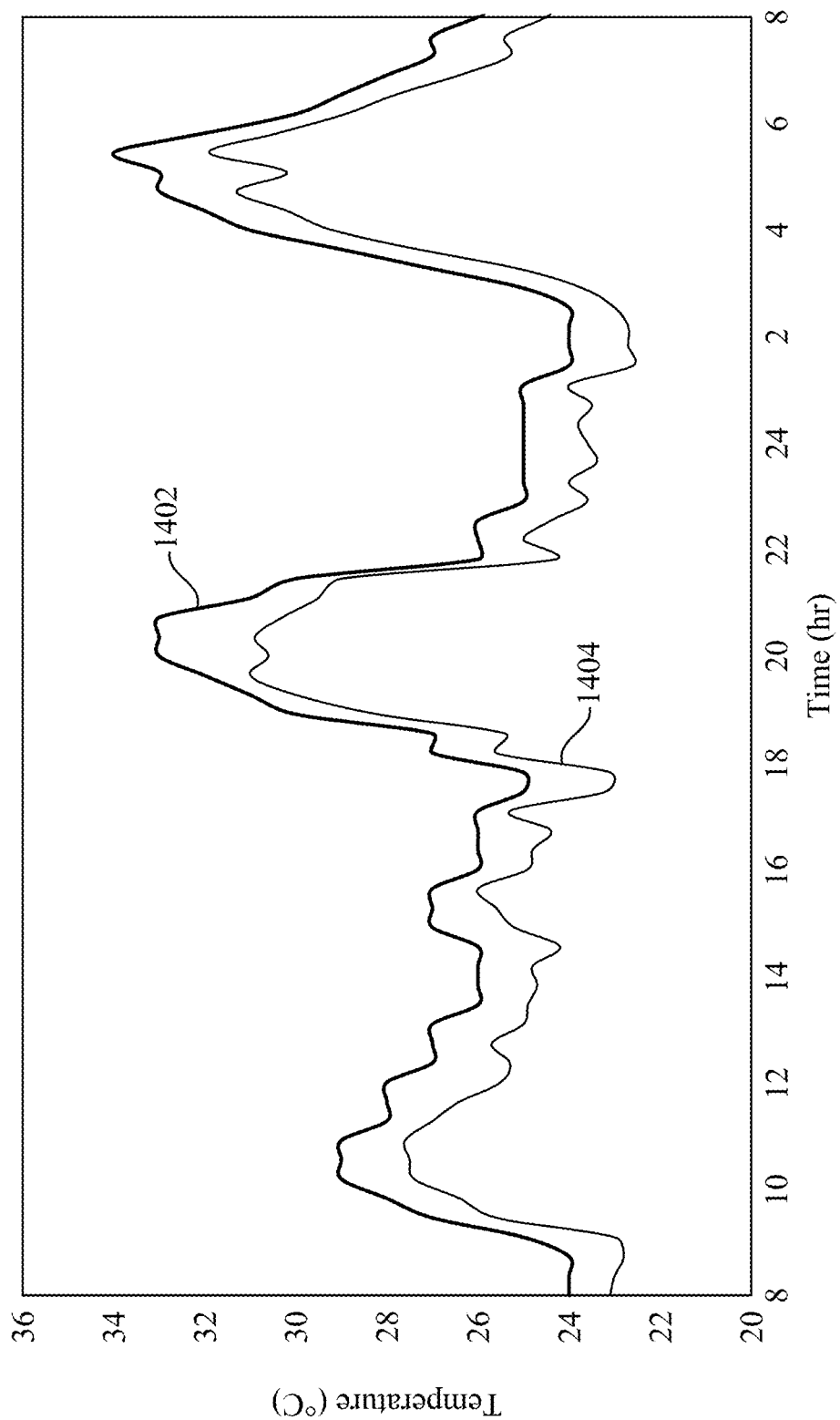
FIG. 14 is a graph illustrating the effect of implementing a photovoltaic Trombe wall (PV-TW) system on indoor conditions of a test room on Day-1, versus time, according to certain embodiments.
Figure 15:
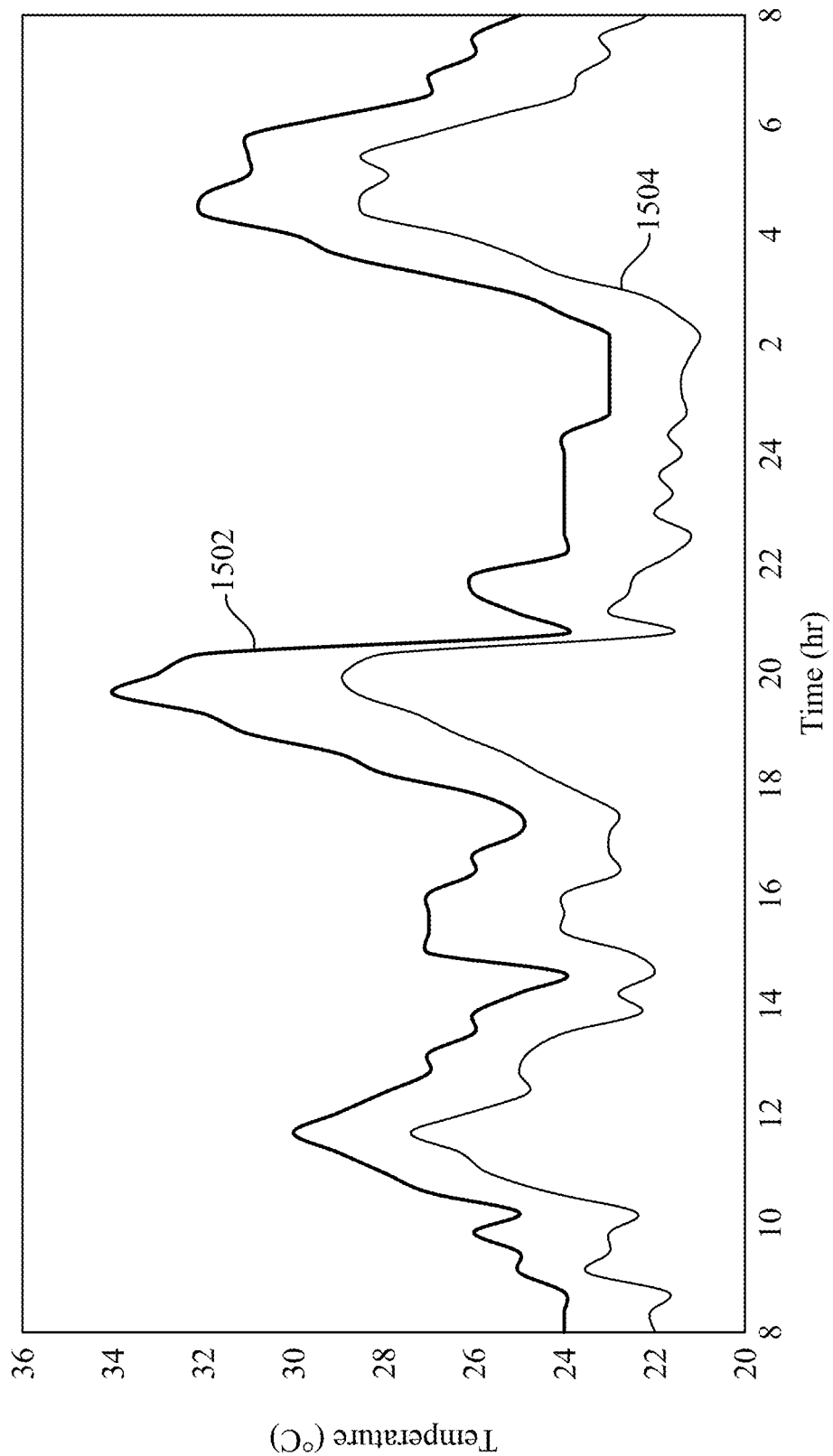
FIG. 15 is a graph illustrating the effect of implementing a photovoltaic Trombe wall (PV-TW) system on indoor conditions of a test room on Day-2, versus time, according to certain embodiments.

FIG. 14 and FIG. 15 are graphs illustrating the effect of implementing a photovoltaic (PV) Trombe wall (TW) on indoor conditions of the single-room house facility (also referred to as the test room). The PV-TW system was tested for three levels of input current but only two significant curves were observed. When the PV-TW system was operated on Day-1, reduced indoor temperature in a range of 2.2° C. to 3.9° C. was observed as illustrated in FIG. 14, where a first plot 1402 indicates ambient temperature and a second plot 1404 indicates indoor temperature. It is clear from the FIG. 15 that the performance of the PV-TW system is highly dependent on the outside climatic conditions (i.e., outside temperature and solar radiation intensity). Significant indoor temperature reduction was achieved during the initial and the final hour of operation of the PV-TW system, where a third plot 1502 indicates ambient temperature and a fourth plot 1504 indicates indoor temperature.

Figure 16:
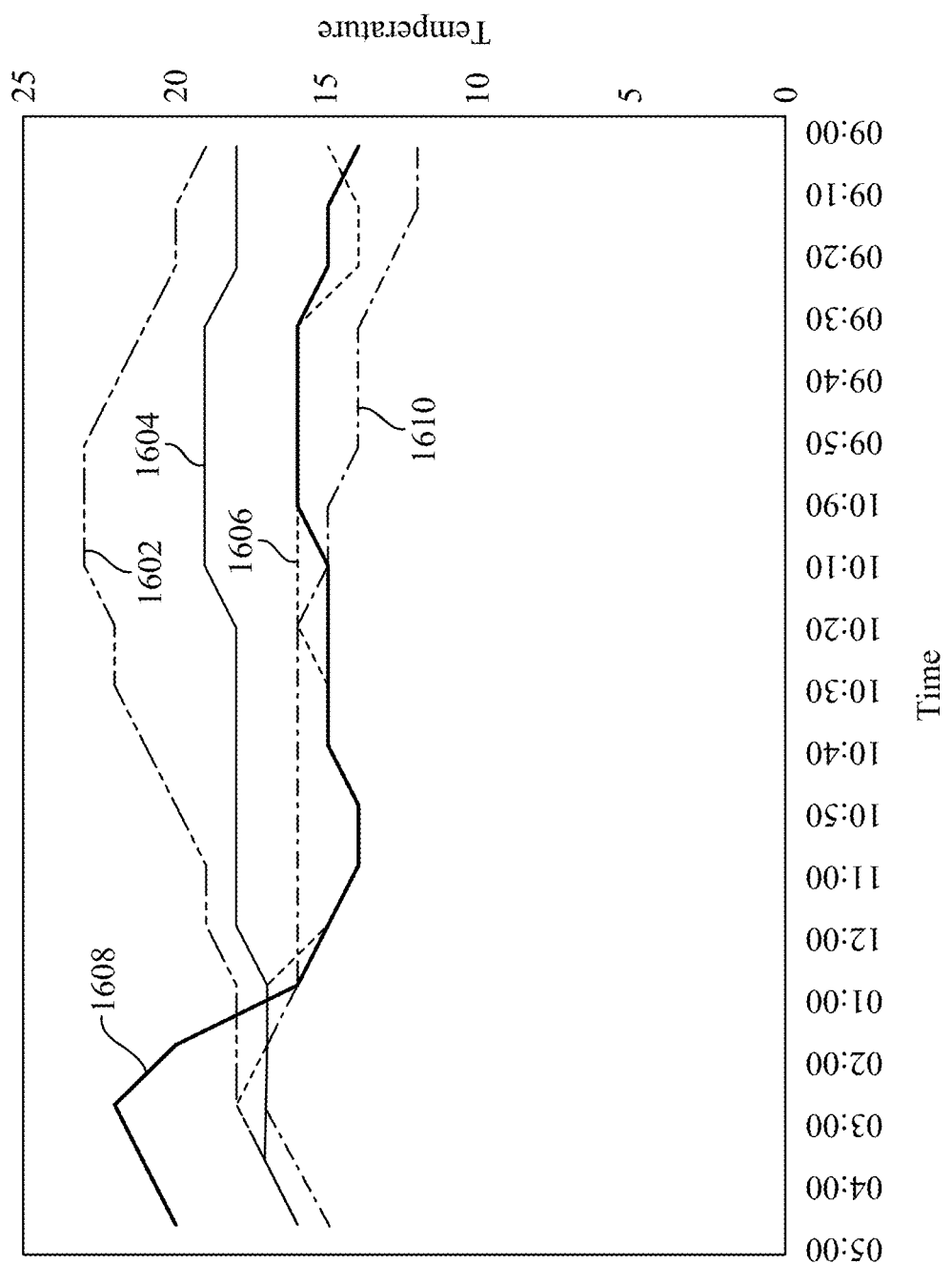
FIG. 16 is a graph illustrating variations in temperature in rooms of a building, versus time, according to certain embodiments.
Figure 17:
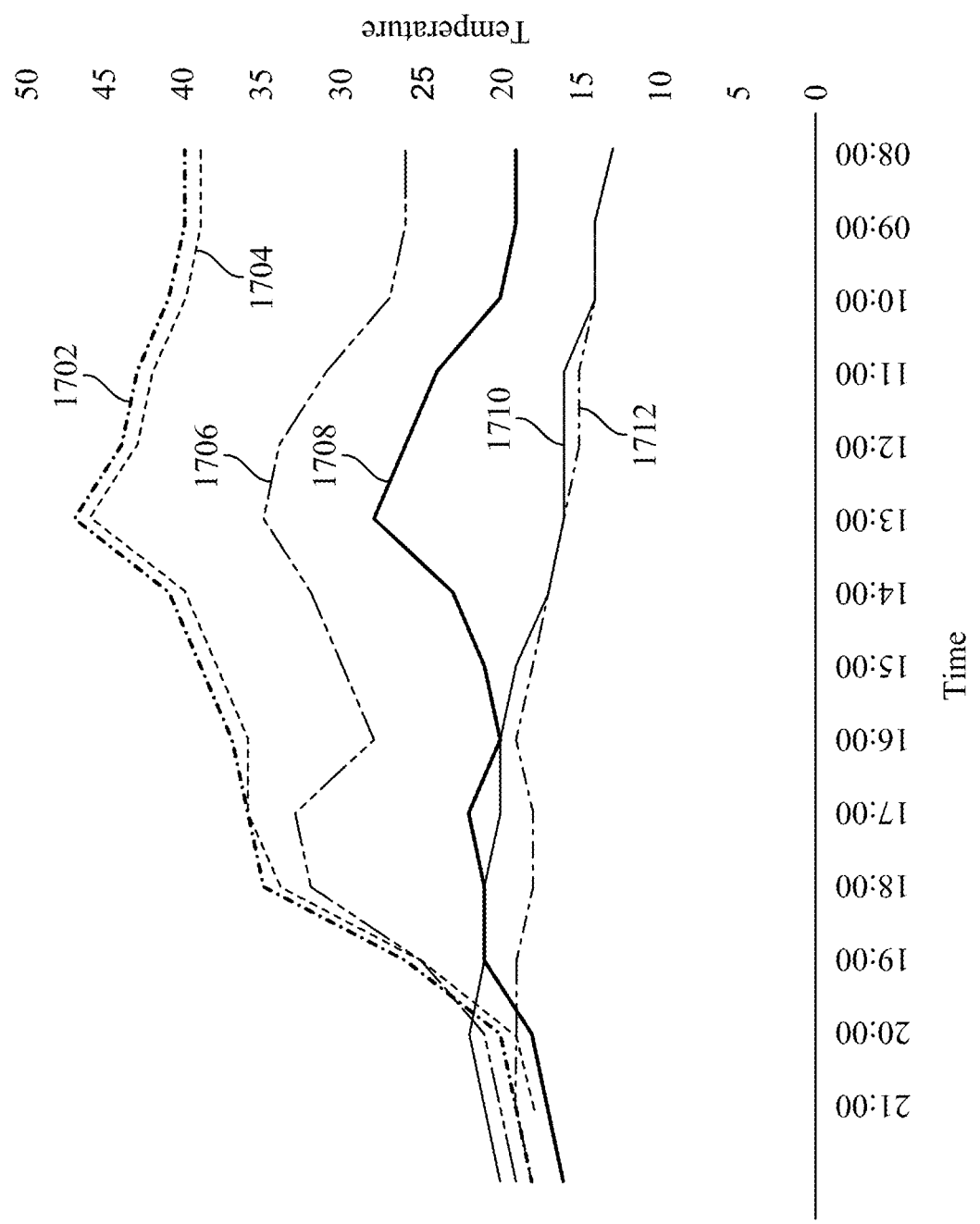
FIG. 17 is a graph illustrating variations in temperature in in rooms of a building, versus time, according to certain embodiments.

FIG. 16 is a graph illustrating variance of temperature in a normal room. A plot 1602 indicates temperature measured outside of a south wall of the test room, plot 1604 indicates temperature measured outside of an east wall of the test room, plot 1606 indicates temperature measured outside of a north wall of the test room, plot 1608 indicates temperature measured outside of a west wall of the test room, and plot 1610 indicates temperature measured inside of the west wall of the test room. FIG. 17 is a graph illustrating variance of temperature in a normal room with PV wall. A plot 1702 indicates temperature measured at a back portion of the PV unit, plot 1704 indicates temperature measured at a front portion of the PV unit, plot 1706 indicates temperature measured at an exterior portion of a normal wall, plot 1708 indicates temperature measured at an exterior portion of a wall with the PV unit mounted thereon, plot 1710 indicates temperature measured at a portion of the normal wall that faces the building interior "I", and plot 1712 indicates temperature measured at a portion of the wall with the PV unit that faces the building interior "I".

Figure 18:
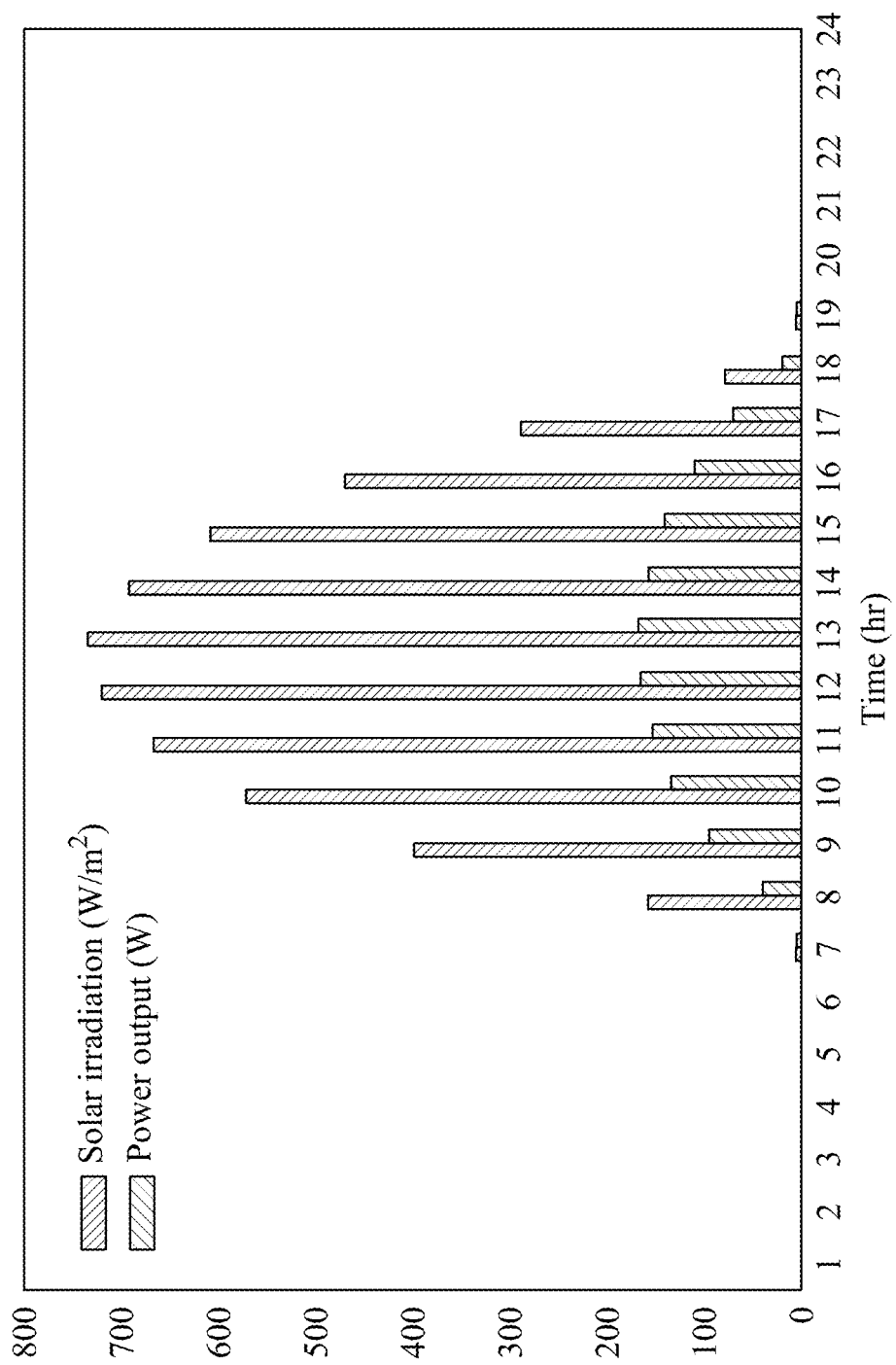
FIG. 18 is a graph illustrating variation of solar irradiation and power output of a south facing photovoltaic wall, versus time, according to certain embodiments.

FIG. 18 is a graph illustrating variation of solar irradiance falling on the south facing PV wall (first wall 104) with solar power output. Results showed that as the solar irradiation falling on the first wall 104 increases, power output increases and reaches a maximum to 166.74 W at 1 pm. After that, it can be observed that power production decreases as intensity of solar radiation decreases. Maximum electrical energy was generated in the time period of 11 am to 4 pm by the first wall 104. Total one day power production by 300 Wp PV panel was 1.24 kWh. Results show that as the solar irradiation falling on the PV wall increased, power output increased and reached a maximum of 168.34 W, after that power production decreased as intensity of solar radiation decreased. Total monthly power production by 300 Wp PV panel was found to be 29.79 kWh.

The invention claimed is:

1. An air cooling and heating system for a building, the building having a plurality of walls, a floor, and a roof, the air cooling and heating system comprising:
   a photovoltaic phase change material wall unit comprising a plurality of photovoltaic units and a phase change material, wherein the phase change material is installed as a layer on a back side of each of the plurality of photovoltaic units, the photovoltaic phase change material wall unit is attached to a first wall so that a back side of the photovoltaic phase change material wall unit faces the first wall, a front side of the photovoltaic phase change material wall unit faces towards an exterior environment, wherein an air gap is formed between the back side and the first wall and is coaligned therewith, the layer of phase change material extends in part into the air gap, and the photovoltaic phase change material wall unit is configured to generate a first electric current from a solar radiation;
   a first air duct attached to a second wall, wherein the second wall is opposite the first wall;
   a second air duct connected to the first air duct and the air gap, wherein the second air duct is attached to the roof;
   a plurality of Peltier based thermoelectric units located in the first air duct, wherein the plurality of Peltier based thermoelectric units are configured to convert an air flow in the first air duct from a first temperature to a second temperature;
   a plurality of Seebeck effect based thermoelectric units located in the second air duct, wherein the plurality of Seebeck effect based thermoelectric units are configured to generate a thermoelectric power from a temperature differential between an air flow in the second air duct and an air flow in a building interior;
   a photovoltaic phase change material roof unit attached to an exterior surface of the second air duct, wherein the photovoltaic phase change material roof unit is configured to convert the solar radiation to a second electric current and provide at least a portion of the second electric current to the plurality of Peltier based thermoelectric units;
   a rechargeable battery;
   a plurality of vents;
   a plurality of grates;
   at least one fan configured to draw the air flow through the air gap formed between and coaligned with the back side and the first wall, and through the first air duct, the second air duct, and the building interior; and
   a controller connected to each of the photovoltaic phase change material wall unit, the photovoltaic phase change material roof unit, the plurality of Peltier based thermoelectric units, the plurality of Seebeck effect based thermoelectric units, the rechargeable battery, and the at least one fan, wherein the controller is configured to control the photovoltaic phase change material wall unit, the photovoltaic phase change material roof unit, the plurality of Peltier based thermoelectric units, the plurality of Seebeck effect based thermoelectric units, and the at least one fan to circulate the air flow within the air gap, the first air duct, the second air duct and the building interior.

2. The air cooling and heating system of claim 1, wherein the photovoltaic phase change material wall unit comprises:
   a first photovoltaic panel including a plurality of arrays of solar cells;
   a first glazed cover located on a front side of the first photovoltaic panel;
   a first photovoltaic phase change material configured as a layer to cover a back side of the first photovoltaic panel, wherein the back side of the first photovoltaic panel is in contact with the air flow in the air gap; and
   a first junction box including an electrical circuitry connected to the plurality of arrays of solar cells of the first photovoltaic panel.

3. The air cooling and heating system of claim 2, wherein the plurality of Peltier based thermoelectric units are configured to convert one of a hot air flow from the exterior environment to a cool air flow in the first air duct and a cool air flow from the exterior environment to a hot air flow in the first air duct.

4. The air cooling and heating system of claim 2, wherein:
   each Peltier based thermoelectric unit includes a first ceramic plate and a second ceramic plate;
   the controller is configured to provide the first electric current to each of the plurality of Peltier based thermoelectric units; and
   each of the plurality of Peltier based thermoelectric units is configured to use the first electric current to generate a temperature differential between the first ceramic plate and the second ceramic plate.

5. The air cooling and heating system of claim 4, further comprising:
   a series connection of the plurality of Seebeck effect based thermoelectric units, wherein the series connection includes a positive terminal and a negative terminal,
   wherein the rechargeable battery is connected to the positive terminal and the negative terminal, and
   wherein the thermoelectric power generated by the plurality of Seebeck effect based thermoelectric units is stored by the rechargeable battery.

6. The air cooling and heating system of claim 5, wherein the photovoltaic phase change material roof unit comprises:
   a second photovoltaic panel including a plurality of arrays of solar cells;
   a second glazed cover located on a top side of the second photovoltaic panel, wherein the second glazed cover faces the exterior environment;
   a second photovoltaic phase change material configured to cover a back side of the second photovoltaic panel, wherein the back side of the second photovoltaic panel is in contact with the air flow in the second air duct; and
   a second junction box including electrical circuitry connected to the plurality of arrays of solar cells of the second photovoltaic panel, wherein the second junction box is connected to the plurality of Peltier based thermoelectric units, such that the second electric current is provided to the plurality of Peltier based thermoelectric units.

7. The air cooling and heating system of claim 6, further comprising:
   a first grate located in the first wall near the floor, wherein the first grate is configured to provide a first air flow passage between the building interior and the air gap;
   a second grate located in the second wall near the floor, wherein the second grate is configured to provide a second air flow passage between the exterior environment and the second air duct.

8. The air cooling and heating system of claim 7, further comprising:
- a first vent of the plurality of vents located between the air gap and the second air duct, wherein the first vent is configured to provide a third air flow passage between the external environment, the air gap and the second air duct;
- a first fan located in a junction between the air gap and the second air duct, and behind the first vent, wherein the controller is electrically connected to the first fan, wherein the controller is configured to generate a first set of fan drive signals to actuate the first fan to suction air from the air gap and the second air duct and expel the air through the first vent into the exterior environment.

9. The air cooling and heating system of claim 8, further comprising:
- a divider located in the first air duct, along a central axis which extends from the floor to the roof, wherein the divider bisects the air flow in the first air duct into a first air stream at the first temperature in a first half of the first air duct and a second air stream at the second temperature in a second half of the first air duct;
- wherein each of the plurality of Peltier based thermoelectric units is attached to the divider such that the first ceramic plate contacts the divider, and the second ceramic plate extends into the second half of the first air duct, and
- wherein the first temperature equals a temperature of the exterior environment, and the second temperature equals a temperature of the second ceramic plate of each of the Peltier based thermoelectric units.

10. The air cooling and heating system of claim 9, further comprising:
- a second vent of the plurality of vents located between the building interior and the second half of the first air duct, at a position where the second wall meets the roof, wherein the second vent is configured to provide a fourth air flow passage between the second half of the first air duct and the building interior;
- a second fan located in the second vent, wherein the controller is electrically connected to the second fan, and wherein the controller is configured to generate a second set of fan drive signals to actuate the second fan to suction the second air stream from the second half of the first air duct and expel the second air stream through the second vent into the building interior.

11. The air cooling and heating system of claim 10, wherein each Seebeck effect based thermoelectric unit further comprises:
- an n-type semiconductor in parallel with a p-type semiconductor, wherein the n-type semiconductor is separated from the p-type semiconductor by a space;
- a first metal surface covering a first face of the n-type semiconductor, the space and a first face of the p-type semiconductor;
- a second metal surface located opposite the first metal surface, wherein the second metal surface is configured to cover a second face of the n-type semiconductor and a second face of the p-type semiconductor; and
- wherein each Seebeck effect based thermoelectric unit is mounted within the second air duct so that the first metal surface contacts a wall of the second air duct which contacts the roof, and the second metal surface extends into the first air stream.

12. The air cooling and heating system of claim 11, wherein each of the first vent and the second vent include:
- a plurality of moveable vanes connected to a lever, wherein the lever is configured to open and close the plurality of moveable vanes;
- a motor connected to the lever, wherein the motor is configured to raise and lower the lever, wherein the controller is electrically connected to the motor; and
- the controller is configured to generate motor drive signals to actuate the motor.

13. The air cooling and heating system of claim 1, wherein the plurality of Peltier based thermoelectric units located in the first air duct are configured to operate at 5 amps.

14. The air cooling and heating system of claim 1, wherein the photovoltaic phase change material roof unit attached to the exterior surface of the second air duct has an angle of 35° relative to an exterior surface of the roof, or a maximum power point tracking (MPPT) system is operatively coupled to the photovoltaic phase change material roof unit.

* * * * *